United States Patent
Baik et al.

(10) Patent No.: US 9,137,512 B2
(45) Date of Patent: Sep. 15, 2015

(54) METHOD AND APPARATUS FOR ESTIMATING DEPTH, AND METHOD AND APPARATUS FOR CONVERTING 2D VIDEO TO 3D VIDEO

(75) Inventors: Aron Baik, Yongin-si (KR); Yong Ju Jung, Daejeon (KR); Ji Won Kim, Seoul (KR); Du-Sik Park, Suwon-so (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 614 days.

(21) Appl. No.: 12/458,559

(22) Filed: Jul. 15, 2009

(65) Prior Publication Data

US 2010/0141757 A1    Jun. 10, 2010

(30) Foreign Application Priority Data

Dec. 4, 2008   (KR) ................ 10-2008-0122655

(51) Int. Cl.
*H04N 7/18*        (2006.01)
*H04N 13/00*      (2006.01)
*G06T 7/00*        (2006.01)
*H04N 13/02*      (2006.01)

(52) U.S. Cl.
CPC .......... *H04N 13/0029* (2013.01); *G06T 7/0077* (2013.01); *G06T 2207/10021* (2013.01); *G06T 2207/20228* (2013.01); *H04N 13/026* (2013.01)

(58) Field of Classification Search
CPC ............... G06T 7/0077; G06T 2207/20228; G06T 2207/10021; H04N 13/0029; H04N 13/026
USPC ............ 348/25–172, 384.1–440.1, 699–702, 348/818–843; 382/154; 345/505, 582; 340/990

See application file for complete search history.

(56) References Cited

U.S. PATENT DOCUMENTS

| 5,852,671 | A   | * | 12/1998 | Oshima .................. 382/154 |
|-----------|-----|---|---------|-----------------------------------|
| 6,266,072 | B1  | * | 7/2001  | Koga et al. .............. 345/505 |
| 6,384,859 | B1  |   | 5/2002  | Matsumoto et al. |
| 6,504,569 | B1  | * | 1/2003  | Jasinschi et al. ........... 348/43 |
| 8,340,422 | B2  |   | 12/2012 | Boughorbel |
| 8,384,763 | B2  | * | 2/2013  | Tam et al. ................. 348/43 |
| 2007/0024614 | A1 |  | 2/2007  | Tam et al. |
| 2008/0012732 | A1 | * | 1/2008 | Egashira ................. 340/990 |
| 2008/0150945 | A1 |  | 6/2008  | Wang et al. |

(Continued)

FOREIGN PATENT DOCUMENTS

EP    0 665 697    1/1995
JP    6-105338    4/1994

(Continued)

OTHER PUBLICATIONS

Itti L. et al., "Feature Combination Strategies for Saliency-Based Visual Attention Systems", Journal of Electronic Imaging, SPIE/IS &T vol. 10, No. 1, Jan. 1, 2001, pp. 161-169.

(Continued)

*Primary Examiner* — Y Lee
*Assistant Examiner* — Richard Carter
(74) *Attorney, Agent, or Firm* — Harness, Dickey & Pierce, P.L.C.

(57) ABSTRACT

A depth estimation and conversion apparatus and method is provided. Depth of an video may be estimated by extracting feature information from the input video, and estimating the depth of the input video based on the extracted feature information.

47 Claims, 16 Drawing Sheets

(56) References Cited

U.S. PATENT DOCUMENTS

| | | | |
|---|---|---|---|
| 2008/0205791 A1* | 8/2008 | Ideses et al. | 382/285 |
| 2008/0247670 A1* | 10/2008 | Tam et al. | 382/298 |
| 2008/0252652 A1* | 10/2008 | Jiao et al. | 345/582 |
| 2008/0267494 A1* | 10/2008 | Cohen et al. | 382/166 |

FOREIGN PATENT DOCUMENTS

| | | |
|---|---|---|
| JP | 7-296165 | 11/1995 |
| JP | 09-037301 | 2/1997 |
| JP | 10-32841 | 2/1998 |
| JP | 11-098531 | 4/1999 |
| JP | 2000-261828 | 9/2000 |
| JP | 2003-106812 | 4/2003 |
| JP | 2005-151534 | 6/2005 |
| JP | 2008-282110 | 11/2008 |
| KR | 10-0414629 | 5/2004 |
| KR | 10-2004-0084455 | 10/2004 |
| KR | 10-2006-0036230 | 4/2006 |
| KR | 10-2006-0119864 | 11/2006 |
| KR | 10-2008-0047673 | 5/2008 |
| KR | 10-2008-0051015 | 6/2008 |
| WO | 2008/062351 | 5/2008 |

OTHER PUBLICATIONS

Bahmani H. et al., "Nonlinear Data Fusion in Saliency-Based Visual Attention", Intelligent Systems, 2008. IS '08. 4th International IEEE Conference, IEEE, Piscataway, NJ, USA, Sep. 6, 2008, pp. 3-27.

European Search Report was issued Dec. 8, 2009 corresponds to European Patent Application No. 09175537.1.

W. J. Tam et al., "Stereoscopic Image Rendering Based on Depth Maps Created From Blur and Edge Information" 2005, pp. 104-115, SPIE-IS&T vol. 5664.

Chinese Office Action issued May 6, 2013 in corresponding Chinese Application No. 200910252846.3.

Japanese Office Action issued Nov. 28, 2013 in corresponding Japanese Application No. 2010-060417.

Japanese Office Action issued on Nov. 12, 2013 in corresponding Japanese Application No. 2009-273702.

Japanese Office Action issued Mar. 4, 2014 in corresponding Japanese Patent Application 2009-273702.

Korean Office Action issued Sep. 11, 2014 in corresponding Korean Patent Application No. 10-2008-0122655.

* cited by examiner

METHOD AND APPARATUS FOR ESTIMATING DEPTH, AND METHOD AND APPARATUS FOR CONVERTING 2D VIDEO TO 3D VIDEO

CROSS-REFERENCE TO RELATED APPLICATIONS

This application claims the benefit of Korean Patent Application No. 10-2008-122655, filed on Dec. 4, 2008, in the Korean Intellectual Property Office, the disclosure of which is incorporated herein by reference.

BACKGROUND

1. Field

One or more embodiments relate to a depth estimation apparatus and depth estimation method capable of providing depth information for converting a two dimensional (2D) monocular video into a stereoscopic video (hereinafter, '3D video') when depth information is not provided, and more particularly, and a depth establishment apparatus being a 3D video conversion apparatus and a depth establishment method being a 3D video conversion method.

2. Description of the Related Art

With the dramatic increase of interest in 3D video, various research and study of 3D video has been conducted.

In general, it is known that a human experiences a 3D effect mostly due to the perceived binocular disparity between both eyes. Accordingly, 3D video may be realized using such a human perception. As an example, to display an object in 3D video, corresponding simultaneously displayed images are respectfully viewed by each of the right and left eyes, thereby enabling a viewer to experience the object as being in 3D. Consequently, 3D video may be realized through the manufacture of binocular video, i.e., video having separate left and right images, and displaying the binocular video.

SUMMARY

One or more embodiments provide an apparatus and system for depth measuring and/or conversion of a monocular 2D video into a 3D video without being provided depth information, with the depth measurement being accomplished through a rendering process generating depth information for the 2D video.

One or more embodiments may provide an apparatus for estimating depth, the apparatus including a feature information extraction unit to extract at least one feature information from an input video, the feature information being independent of any pre-established depth values of the input video, and a depth establishment unit to establish a depth of a portion of the input video based on the at least one feature information with regard to the portion of the input video.

One or more embodiments may provide a 3D video conversion apparatus, the apparatus including an extraction unit to extract at least one feature information from an input video, the feature information being independent of any pre-established depth values of the input video, a depth establishment unit to establish a depth of a portion of the input video based on the at least one feature information with regard to the portion of the input video, and a rendering unit to render the input video into a 3D video using the established depth of the portion of the input video.

One or more embodiments may provide a depth estimation method, the method including extracting at least one feature information from an input video, the feature information being independent of pre-established depth values of the input video, and establishing a depth of a portion of the input video based on the at least one feature information with regard to the portion of the input video.

One or more embodiments may provide a 3D video conversion method, the method including extracting at least one feature information from an input video, the feature information being independent of any pre-established depth values of the input video, establishing a depth of a portion of the input video based on the at least one feature information with regard to the portion of the input video, and rendering the input video into a 3D video using the established depth of the portion of the input video.

One or more embodiments may provide an apparatus for estimating depth, the apparatus including a feature information extraction unit to extract at least one feature information from an input image, the feature information being independent of any pre-established depth values of the input image, and a depth establishment unit to establish a depth of a portion of the input image based on the at least one feature information with regard to the portion of the input image.

One or more embodiments may provide a depth estimation method, the method including extracting at least one feature information from an input image, the feature information being independent of pre-established depth values of the input image, and establishing a depth of a portion of the input image based on the at least one feature information with regard to the portion of the input image.

By using a depth estimation apparatus and depth estimation method estimating a depth for converting an input 2D video into a 3D video based on at least one feature information, a 3D video conversion apparatus and 3D video conversion method with the depth estimation apparatus and the depth estimation method, a 2D video may be converted into a 3D video.

Additional aspects, features, and/or advantages will be set forth in part in the description which follows and, in part, will be apparent from the description, or may be learned by practice of the disclosure.

BRIEF DESCRIPTION OF THE DRAWINGS

These and/or other aspects, features, and advantages will become apparent and more readily appreciated from the following description, taken in conjunction with the accompanying drawings of which.

DETAILED DESCRIPTION OF EMBODIMENTS

Figure 1:
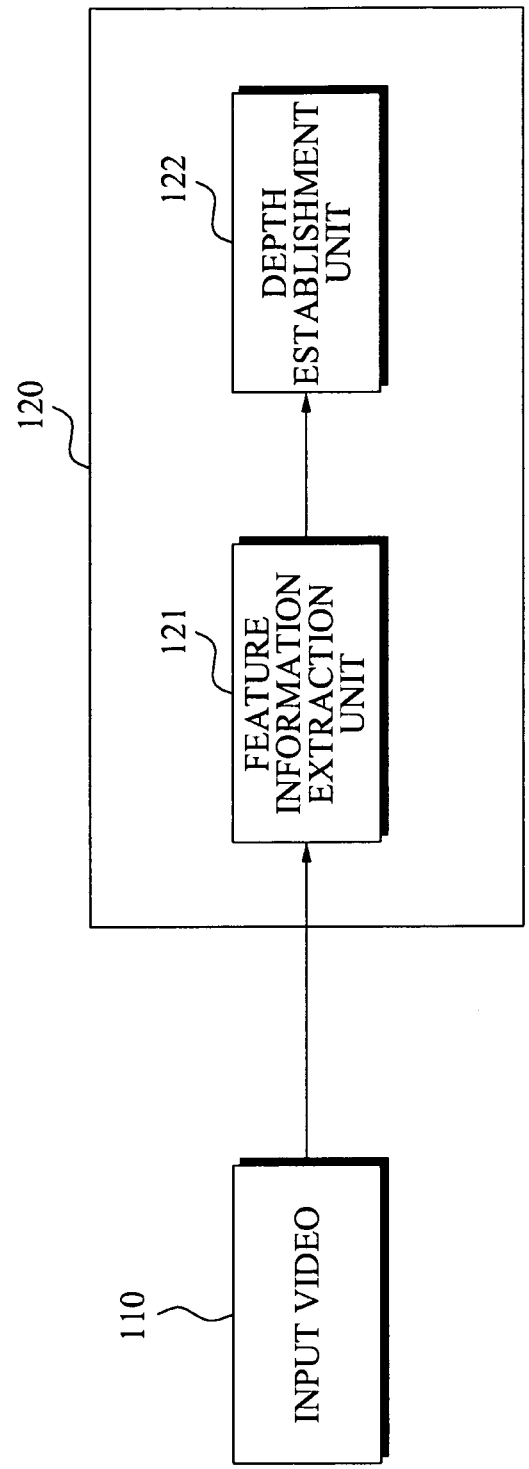
FIG. 1 is a diagram illustrating a structure of a depth estimation apparatus, according to one or more embodiments.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 is a diagram illustrating a structure of a depth estimation apparatus 120, according to one or more embodiments. Here, the depth estimation apparatus 120 may include a feature information extraction unit 121 and a depth establishment unit 122, for example. Herein, throughout the following description, the term apparatus should be considered synonymous with elements of a physical system, not limited to a single enclosure or all described elements embodied in single respective enclosures in all embodiments, but rather, depending on embodiment, is open to being embodied together or separately in differing enclosures and/or locations through differing elements. As only another example, a respective apparatus/system or method could also be controlled through one or more processing elements/devices or implemented by a distributed network, noting that additional and alternative embodiments are equally available.

When an input video 110 is provided to the depth estimation apparatus 120, the feature information extraction unit 121 may obtain at least one feature information of the input video 110, and provide the extracted at least one feature information of the input video 110 to the depth establishment unit 122.

According to one or more embodiments, the input video 110 may be a monocular video, without depth information. As another example, the input video 110 may be spatially-interleaved stereo video, temporally-interleaved stereo video, and monocular video with depth information. Also, according to one or more embodiments, the feature information extracted in the feature information extraction unit 121 may be at least one of edge information, color information, luminance information, motion information, and/or histogram information, noting that alternatives are equally available. The feature information may be with regard to an image, such as a frame of a video, or may be with regard to plural images or frames and with regard to the video.

The depth establishment unit 122 may establish a depth of the input video 110 based on the at least one feature information received from the feature information extraction unit 121.

The depth estimation unit 120 may, thus, convert a two dimensional (2D) input video into a stereoscopic video (hereinafter, '3D video') by establishing a depth of the input video 110 based on feature information of the input video 110. If depth information for one or more pixels of the input video already exists, then the depth estimation unit 120 can convert or modify the input video to estimate depth for the one or more pixels of the input video based on the extracted feature information, with the at least one feature information being independent of such potentially preexisting or pre-established depth values of the one or more pixels. Here, the estimating of the depth for the one or more pixels may be based both on the preexisting or pre-established depth values and the extracted feature information, or solely on the extracted feature information. Alternatively, for example, if any or all preexisting or pre-established depth values for an input video do not exist, then the input video may merely be a 2D video without any previous depth information; the extracted at least one feature information would inherently be independent of any preexisting or pre-established depth values since they do not exist. In an embodiment, there may also be a review of any pre-established depth data, and if deemed accurate and precise, for example, only the pre-established depth data may be used and further estimation of depths would not be necessary.

According to one or more embodiments, a depth estimation apparatus 120, such as shown in FIG. 1, may be implemented in alternative and/or additional embodiments. Various embodiments regarding the depth estimation apparatus 120 are described with reference to FIGS. 2 through 4, again noting that alternative embodiments are equally available.

Figure 2:
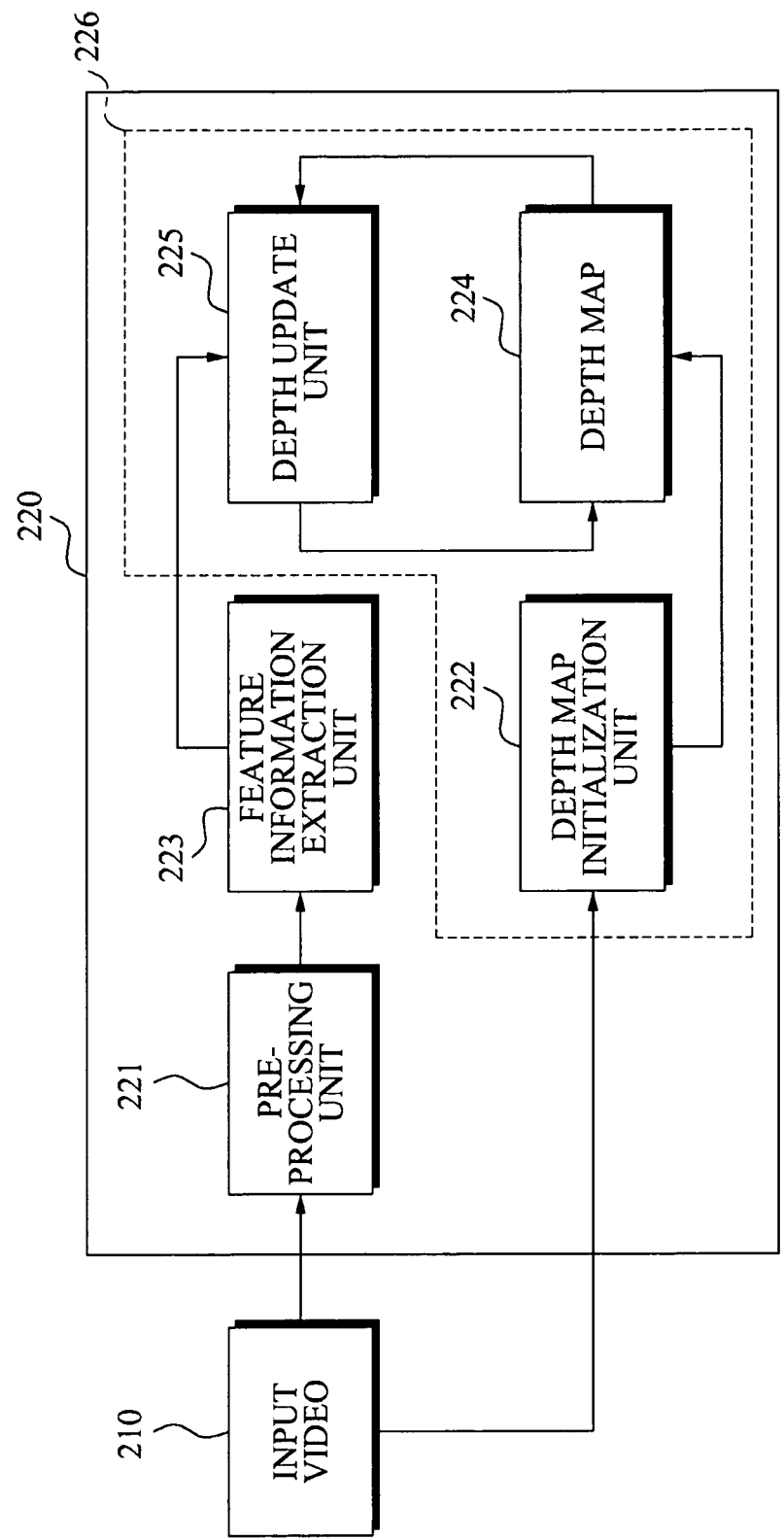
FIG. 2 is a diagram illustrating a structure of a depth estimation apparatus, according to one or more other embodiments.

FIG. 2 is a diagram illustrating a structure of a depth estimation apparatus 220, according to one or more other embodiments. Here, the depth estimation apparatus 220 may include a feature information extraction unit 223 and a depth establishment unit 226, for example. According to an embodiment, the depth establishment unit 226 may further include a depth map initialization unit 222 and a depth update unit 225, for further example.

When an input video 210 is provided to the depth estimation unit 220, the depth map initialization unit 222 may establish an initial depth of at least one pixel of the input video 210, and store the established initial depth of the at least one pixel in a depth map 224. The at least one pixel may be with regard to a single image, e.g., a single frame of the input video 210, or with regard to plural images or frames of the input video 210. For example, a depth of a portion of one frame corresponding to an identified object could be merely applied to the same object in other frames.

According to one or more embodiments, the input video 210 may be a monocular video. Also, according to one or more embodiments, the depth map initialization unit 222 may establish an initial depth for each frame of a sequence of the input video 210, and store the initial depth for each frame of the sequence of the input video 210 in the depth map 224.

According to an embodiment, the depth map initialization unit 222 may establish the initial depth by the below Equation 1, for example.

$$z(x,y) = y/N \qquad \text{Equation 1:}$$

Here, (x, y) indicates image coordinates within the input video 210, e.g., within a frame of the input video, and z indicates a respective depth. In this instance, z may be a value between 0 to 1 depending on the distance of an object represented in the input video 210 from a view point, for example. As an example, when the object is located relatively far from the observer, the depth of the object may be considered to be greater or 'deeper', and in this instance, z may be a value close to 1, for example. Conversely, when the object is located relatively close to the observer, the depth of the object may be considered to be less and 'shallower', and in this instance, z may be a value close to 0, also as an example. Here, N indicates a number of a horizontal line of an image of the input video 210.

Referring to Equation 1, the initial depth depends on y coordinates of the image of the input video 210. In general, in the case of the object represented in the input video 210, an object located in an upper portion of the input video 210 may be considered to be located farther away than an object located in a lower portion of the input video 210.

Therefore, using such a feature, i.e., the vertical positioning of the object within a frame, the initial depth for that object may be established by determining the depth of the object located in the upper portion of the input video 210 to be deeper than the depth of the object located in the lower portion of the input video 210. Briefly, it is noted that alternate features, including any extracted feature information, may be used for such initial depth establishment. Further, embodiments of the present invention are not limited to the use of Equation 1, even if such a vertical positioning feature is implemented.

When the depth estimation apparatus 220 establishes the initial depth, e.g., through the depth map initialization unit 222, and stores the initial depth, a user may convert the input video 210 into a 3D video by performing a rendering process for converting the 2D input video 210 into a 3D video using that estimated depth map information.

However, since the initial depth established in the depth map initialization unit 222 is not a smoothed depth mapping, e.g., since the initial depth may be based only on such respective two-dimensional positioning of a respective pixel or object of the input video 210, and not feature information relative to the video, a 3D video which is converted using the initial depth may have inaccurate depths.

Therefore, according to the one or more embodiments, the depth estimation apparatus 220 may further assign comparatively more accurate depth information to the input video 210 by appropriately adjusting depths using feature information of the at least one pixel of the input video 210, based on the initial depth established by the depth map initialization unit 222.

For this, the feature information extraction unit 223 may extract at least one feature information of the input video 210, and provide the extracted information to the depth update unit 225.

According to one or more embodiments, such feature information extracted in the feature information extraction unit 222 may be at least one particular feature information, such as at least one of edge information, color information, luminance information, motion information, and histogram information, for example, noting that alternatives are equally available. As another example, here, depth estimation from certain features may be accomplished through depth perception, such as monocular cues. The depth perception could include a review based on camera focus blur, vanishing lines, and occlusion areas (e.g., from T-junctions).

The depth update unit 225 may calculate a final depth of the input video 210 by performing filtering based on the at least one particular feature information and the initial depth, and update the depth map 224 based on the calculated depth.

According to one or more embodiments, the feature information extraction unit 222 may further calculate a weight(s) between at least one pixel of the input video 210 and adjacent pixels based on the at least one particular feature information.

Here, according to one or more embodiments, the feature information extraction unit 223 may calculate a weight so as to depend on similarities of feature information between the at least one pixel and the adjacent pixels.

Also, according to one or more embodiments, the depth update unit 225 may perform filtering based on the weight(s) calculated in the feature information extraction unit 223.

In the related context, example operations of the feature information extraction unit 225 and the depth update unit 225 will be described in greater detail below.

If it is assumed that the feature information extraction unit 223 extracts luminous information of the input video 210, a weight is then calculated based on the luminous information.

The feature information extraction may calculate a weight between at least one pixel of the input video 210 and adjacent pixels based on the similarity of the luminous information.

As an example, weights between a pixel 'a' and each of pixels 'x', 'y', 'z', and 'w' adjacent to the pixel 'a' may be calculated. When luminosities of the pixels 'x', 'y', 'z', and 'w' are similar to a luminosity of the pixel 'a' in orders of pixels 'x', 'y', 'z', and 'w', weights may be determined in orders of pixels 'x', 'y', 'z', and 'w'.

The depth update unit 225 may then update the initial depth of the pixel 'a' stored in the depth map 224 as the first depth 'a' by calculating a first depth 'a' of the pixel 'a', the first depth 'a' being calculated by applying initial depths of the pixels 'x', 'y', 'z', and 'w' stored in the depth map 224 according to the weights calculated in the feature information extraction unit 223.

At the same time, in the same manner as the pixel 'a', the depth update unit 225 may calculate a first depth 'b' of each of the pixels 'x', 'y', 'z', and 'w' by considering weights between each of the pixels 'x', 'y', 'z', and 'w' and adjacent pixels, and may update initial depths of the pixels 'x', 'y', 'z', and 'w' stored in the depth map 224 as the first depth 'b'.

When the initial depths of the pixels 'x', 'y', 'z', and 'w' are updated into the first depth 'b', the depth update unit 225 may update the first depth 'a' of the pixel 'a' stored in the depth map 224 as the second depth 'a' by calculating a second depth 'a' of the pixel 'a', the second depth 'a' being calculated by applying first depths 'b' of the pixels 'x', 'y', 'z', and 'w' stored in the depth map 224 according to the weights.

In this instance, in the same manner as the pixel 'a', the depth update unit 225 may update the first depth 'b' of each of the pixels 'x', 'y', 'z', and 'w' stored in the depth map 224 as the second depth 'b' based on the weights between the first depths 'b' of each of the pixels 'x', 'y', 'z', and 'w' and each of adjacent pixels.

As described above, the depth update unit 225 may filter depths stored in the depth map 224 by repeatedly performing the above described updating operations.

Consequently, the depth estimation apparatus 220 may convert the input video 210 into a 3D video having an accurate depth by appropriately adjusting depths based on feature information between at least one pixel of the input video 210 and adjacent pixels, for example.

In the related context, the feature information extraction unit 223 may calculate the weights by the below Equation 2, for example.

$$\omega(x, y, x', y') = \exp\left(-\frac{(Y(x', y') - Y(x, y))^2}{2\sigma^2}\right) \quad \text{Equation 2}$$

Here, ω indicates a weight, (x, y) indicates coordinates of at least one pixel of the input video 210, (x', y') indicates coordinates of pixels adjacent to the at least one pixel, γ indicates at least one particular feature information of the input video 210, and σ indicates a filter parameter, and the depth may be calculated according to the below Equation 3, for example.

$$z(x, y) = \frac{1}{k} \sum_{x', y' \in \eta} \omega(x, y, x', y') z(x', y') \quad \text{Equation 3}$$

Here, z(x, y) indicates a depth of at least one pixel of the input video 210, z(x', y') indicates depths of adjacent pixels adjacent to the at least one pixel, w indicates a weight, and k indicates a normalization factor.

As described above, the depth update unit 225 may update depths stored in the depth map 224 according to Equation 3, for example.

According to one or more embodiments, the depth map initialization unit 222 may, thus, establish the initial depth using the at least one particular feature information, and store the established initial depth in the depth map 224.

Consequently, the depth map initialization unit 222 may establish an initial depth in which smoothing has be performed.

The depth estimation apparatus 220 may reduce complexity of iterated operations that may be performed for the depth update unit 225 to smooth depths stored in the depth map 224 by establishing an initial depth in which smoothing may be performed via the depth map initialization unit 222.

In this instance, according to the one or more embodiments, the depth estimation apparatus 220 may include further feature information extraction units in addition to the feature information extraction unit 223.

Here, the depth map initialization unit 222 may establish the initial depth by receiving at least one particular feature information from another feature extraction information unit.

According to one or more embodiments, the depth estimation unit 220 may further include a post-processing unit, the post-processing unit post-processing the depth map 224 to convert the input video 210 into a 3D video having a smoother depth.

Also, according to one or more embodiments, the depth estimation apparatus 220 may further include a pre-processing unit 221.

The pre-processing unit 221 may convert a color space of the input video 310 or may extract a motion vector of the input video 210 by decoding the input video 210 when the input video 210 is a video which is encoded into a predetermined video stream.

When the pre-processing unit 221 performs a function of converting a color space of the input video 210, the feature information extraction unit 223 may extract more accurate feature information of the input video 210.

As an example, when the input video 210 is a video consisting of a YCbCr color space or of a red, green and blue color space, the pre-processing unit 221 may convert the color space of the input video 210 into a L*U*V* color space, for example, so that the feature information extraction unit 223 may extract more accurate feature information of the input video 210.

Also, when the pre-processing unit 221 performs a function of extracting a motion vector of the input video 210 by decoding the input video 210, the feature information extraction unit 223 may extract feature information of the input video 230 using the motion vector.

Figure 3:
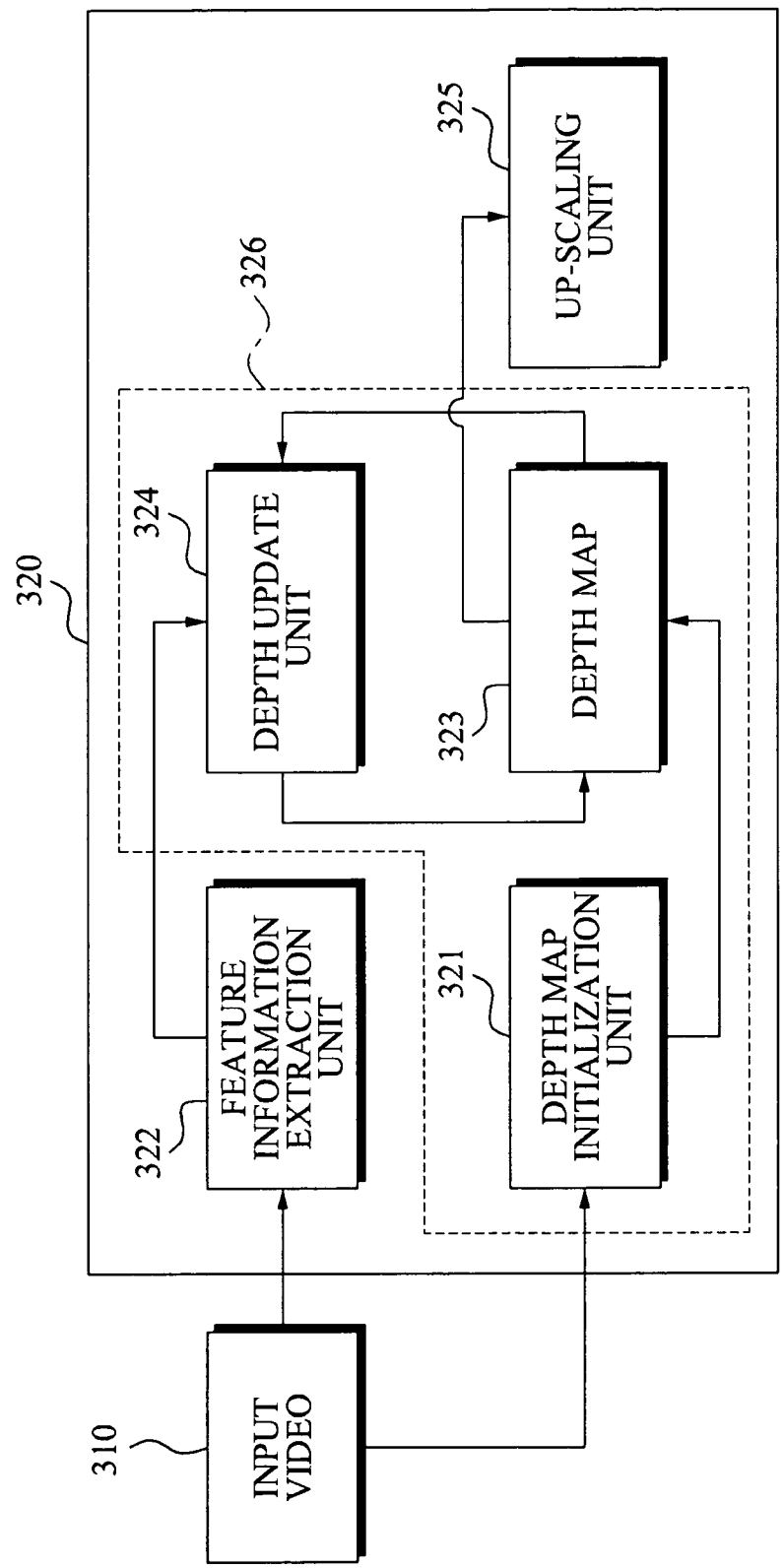
FIG. 3 is a diagram illustrating a structure of a depth estimation apparatus, according to still one or more other embodiments.

FIG. 3 is a diagram illustrating a structure of a depth estimation apparatus 320, according to still one or more other embodiments. The depth estimation apparatus 320 may include a feature information extraction unit 322, an up-scaling unit 325, and a depth establishment unit 326, for example. Further, according to one or more embodiments, the depth establishment unit 326 may further include a depth map initialization unit 321 and a depth update unit 324.

The depth map initialization unit 321 may divide a plurality of pixels of an input video 310 into at least one block, establish an initial depth of the at least one block, and store the initial depth of the at least one block in the depth map 323.

As an example, when a plurality of pixels of the input video 310 are a, b, c, d, e, and f, the depth map initialization unit 321 may divide adjacent pixels of the plurality of pixels into at least one block, such as (a, b), (c, d), or (e, f), establish initial depths of the at least one block, and store the initial depths in the depth map 323.

According to one or more embodiments, the input video 310 may be a monocular video. In addition, according to one or more embodiments, the depth map initialization unit 321 may establish the initial depth according to the above Equation 1, for example, or other features, where (x, y) represent coordinates of the at least one block.

The feature information extraction unit 322 may extract at least one particular feature information of the input video 310 and provide the extracted at least one particular feature information of the input video 310 to the depth update unit 324.

According to one or more embodiments, the at least one particular feature information of the input video 310 extracted in the feature information extraction unit 322 may be at least one of edge information, color information, luminance information, motion information, or histogram information, for example, noting that alternative embodiments are equally available.

The depth update unit 324 may calculate a second depth of the at least one block by performing filtering based on the at least one particular feature information and the initial depth, and update the depth map 323 using the second depth.

According to one or more embodiments, the feature information extraction unit 322 may calculate a weight(s) between the at least one block and each of adjacent blocks based on the at least one particular feature information.

Here, according to one or more embodiments, the feature information extraction unit 322 may calculate the weight(s) so as to depend on similarities of feature information between the at least one block and each of the adjacent blocks.

In this instance, according to one or more embodiments, the feature information extraction unit 322 may calculate the weight according to Equation 2, for example. In this instance, (x, y) represents coordinates of the at least one block, and (x', y') represents coordinates of blocks adjacent to the at least one block.

Also, according to one or more embodiments, the depth update unit 324 may perform the filtering based on the weight(s) calculated in the feature information extraction unit 322.

In this instance, according to one or more embodiments, the depth update unit 324 may perform the filtering according to Equation 3, for example. Here, (x, y) represents coordinates of the at least one block, and (x', y') represents coordinates of blocks adjacent to the at least one block.

In an embodiment, the up-scaling unit 325 may further up-scale the updated depth map 323 based on the plurality of pixels.

Consequently, the depth estimation apparatus 320, according to one or more embodiments, may divide the plurality of pixels of the input video 310 into at least one block, generate the depth map 323, and up-scale the generated depth map 323, thereby generating a depth map for converting the input video 310 into a 3D video through comparatively simple operations.

According to one or more embodiments, the depth map initialization unit 321 may establish an initial depth based on the at least one particular feature information extracted from the feature information extraction unit 322, and store the initial depth in the depth map 323.

Accordingly, the depth map initialization unit 321 may establish the initial depth in which smoothing may be performed.

Consequently, the depth estimation apparatus 320 may reduce complexity of iterated operations that may be performed for the depth update unit 324 to smooth depths stored in the depth map 323 by establishing an initial depth in which smoothing may be performed via the depth map initialization unit 321.

In this instance, according to one or more embodiments, the depth estimation apparatus 320 may further include additional feature information extraction units in addition to the feature information extraction unit 322.

Here, the depth map initialization unit 321 may establish the initial depth by receiving at least one particular feature information from another feature extraction information unit.

According to one or more embodiments, the depth estimation unit 220 may further include a post-processing unit, the post-processing unit post-processing the up-scaled depth map to convert the input video 310 into a 3D video having a smoother depth, for example.

Also, according to one or more embodiments, the depth estimation apparatus 320 may further include a pre-processing unit.

The pre-processing unit may convert a color space of the input video 310, or extract a motion vector of the input video 310 by decoding the input video 310 when the input video 310 is a video which is encoded into a predetermined video stream, for example.

When the pre-processing unit converts the color space of the input video 310, the feature information extraction unit 322 may further extract more accurate feature information of the input video 310.

As an example, when the input video 310 is a video consisting of a YCbCr color space or of a red, green and blue color space, the pre-processing unit may convert the color space of the input video 310 into a L*U*V* color space, for example, so that the feature information extraction unit 322 may extract more accurate feature information of the input video 310.

Also, when the pre-processing unit performs an operation of extracting a motion vector of the input video 310 by decoding the input video 310, the feature information extraction unit 322 may extract feature information of the input video 310 using the motion vector, for example.

Figure 4:
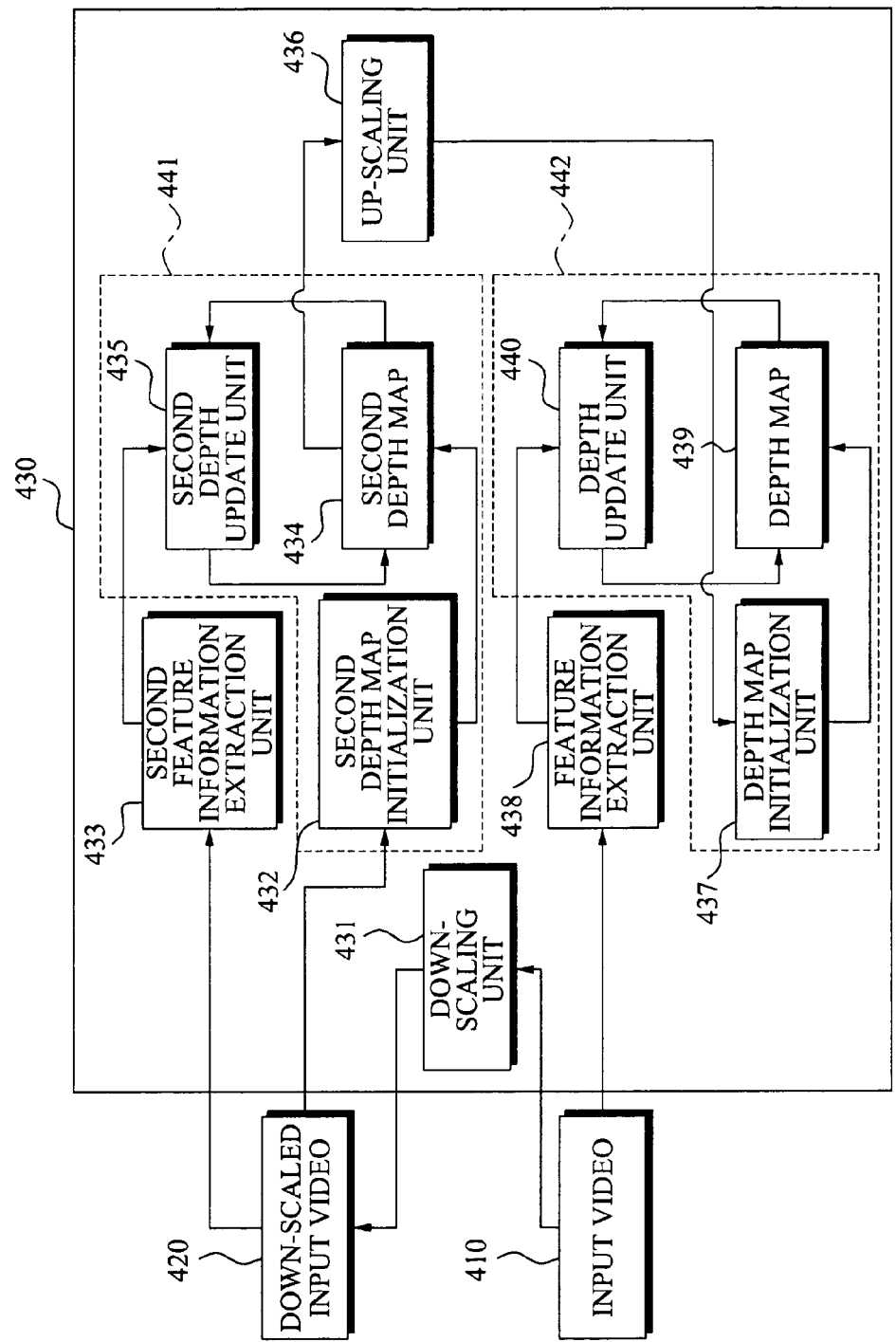
FIG. 4 is a diagram illustrating a structure of a depth estimation apparatus, according to yet one or more other embodiments.

FIG. 4 is a diagram illustrating a structure of a depth estimation apparatus 430, according to one or more embodiments. The depth estimation apparatus 430 may include a feature information extraction unit 438 and a depth establishment unit 442, for example. In addition, according to one or more embodiments, the depth establishment unit 442 may further include a depth map initialization unit 437 and a depth update unit 440.

The depth map initialization unit 437 may establish an initial depth of at least one pixel of an input video 410 and store the established initial depth in a depth map 439.

According to one or more embodiments, the input video 410 may be a monocular video.

The feature information extraction unit 438 may extract at least one particular feature information of the input video 410 and provide the extracted at least one particular feature information to a depth update unit 440.

According to one or more embodiments, the at least one particular feature information extracted in the feature information extraction unit 438 may be at least one of edge information, color information, luminance information, motion information, or histogram information, for example.

The depth update unit 440 may calculate a final depth of the input video 410 by performing filtering based on the at least one particular feature information and the initial depth, and update the depth map 439 based on the calculated depth.

According to one or more embodiments, the feature information extraction unit 222 may calculate a weight between at least one pixel of the input video 210 and each of adjacent pixels based on the at least one particular feature information.

In this instance, according to one or more embodiments, the feature information extraction unit 438 may calculate the weight so as to depend on similarities of feature information between the at least one pixel and the adjacent pixels.

Here, according to one or more embodiments, the feature information extraction unit 438 may calculate the weight according to the aforementioned Equation 2, for example.

Also, according to one or more embodiments, the depth update unit 440 may perform filtering based on the weight.

In this instance, according to one or more embodiments, the depth update unit 440 may perform the filtering according to the aforementioned Equation 3, for example.

As described above, when the depth map initialization unit 437 establishes the initial depth, the depth estimation apparatus 430 may establish a depth of the input video 410, resulting in the depth update unit 440 updating the depth map 439 using the at least one particular feature information.

The depth estimation apparatus 420 may simplify operations for estimating the depth of the input video 410 by down-scaling the input video 430, estimating a second depth of the down-scaled input video, and using the second depth as the initial depth, for example.

In the related context, the depth estimation apparatus 430 may further include a down-scaling unit 431, a second feature information extraction unit 433, a second depth establishment unit 441, and an up-scaling unit 436, for example.

Here, according to one or more embodiments, the second depth establishment unit 441 may include a second depth map initialization unit 432 and a second depth update unit 435, for example.

The down-scaling unit 431 may down-scale the input video 410 received in the depth estimation apparatus 430 to a predetermined resolution.

As an example, when a resolution of the input video is 1024×768, the downscaling unit 431 may down-scale the resolution of the input video 410 into 800×600.

The second depth map initialization unit 432 may establish a second initial depth of at least one pixel of an input video 420, which is down-scaled by the down-scaling unit 431, and store the second initial depth in the second depth map 434.

According to one or more embodiments, the second depth map initialization unit 432 may calculate the second initial depth according to the aforementioned Equation 1, or other features, for example.

The second feature information extraction unit 433 may extract at least one particular second feature information of the down-scaled input video 420 and provide the extracted at least one particular second feature information of the down-scaled input video 420 to the second depth update unit 435.

According to one or more embodiments, the at least one particular second feature information extracted in the second feature information extraction unit 433 may be at least one of edge information, color information, luminance information, motion information, or histogram information, for example.

The second depth update unit 435 may calculate a second depth of the down-scaled input video 420 by performing filtering based on the at least one particular second feature information and the second initial depth, and update the second depth map 434 using the second depth.

According to one or more embodiments, the second feature information extraction unit 433 may calculate a second weight between at least one pixel of the down-scaled input video 420 and each of adjacent pixels based on the at least one particular second feature information.

According to one or more embodiments, the second feature information extraction unit 433 may calculate the second weight so as to depend on similarities of feature information between the at least one pixel and adjacent pixels.

Here, according to one or more embodiments, the second feature information extraction unit 433 may calculate the second weight according to the aforementioned Equation 2, for example.

Also, according to one or more embodiments, the second depth update unit 435 may perform the filtering based on the second weight.

Here, according to one or more embodiments, the second depth update unit 435 may perform the filtering according to the aforementioned Equation 3, for example.

The up-scaling unit 436 may up-scale the updated second depth map 434 based on a resolution of the input video 410 and provide the up-scaled depth map 434 to the depth map initialization unit 437.

Here, according to one or more embodiments, the up-scaling unit 436 may up-scale the second depth map 434 based on the at least one particular second feature information and the at least one particular feature information.

When the up-scaling unit 436 up-scales the second depth map 434, the depth map initialization unit 437 establishes a depth stored in the up-scaled second depth map as an initial depth of the at least one pixel of the input video 410, and stores the initial depth of the at least one pixel in the depth map 439.

As described above, the depth estimation unit 430 establishes a depth in which filtering may be performed as the initial depth, thereby reducing complexity of operations that may be performed for the depth update unit 440 to update the depth map 439 by filtering a depth of the input video 410.

Consequently, the depth estimation apparatus 430 may reduce overall operations for estimating the depth of the input video 410 by down-scaling the input video 410 and generating a depth map using a combination of access methods which generate an initial depth map.

Here, the depth estimation apparatus 430 is illustrated in FIG. 4 as generating the depth map by down-scaling the input video 410 once, however embodiments are not limited to this.

That is, according one or more embodiments, the depth estimation apparatus 430 down-scales the input video 430 n times, generates a depth map from an $n^{th}$ down-scaled input video and up-scales the generated depth map, thereby using as an initial depth map for generating a depth map of an $(n-1)^{th}$ down-scaled input video. Also, in the case of a depth map of the $(n-1)^{th}$ down-scaled input video, the depth map of the $(n-1)^{th}$ down-scaled input video is up-scaled, thereby using as an initial depth map for generating a depth map of an $(n-2)^{th}$ down-scaled input video, as only an example.

Consequently, the depth estimation apparatus 430 may simplify operations for estimating the depth of the input video 410 by using a depth map, generated by repeatedly performing the above described operations, as the initial depth map for generating the depth map of the input video 410.

Above, various embodiments regarding the depth estimation apparatus have been described with reference to FIGS. 1 through 4. Hereinafter, various embodiments regarding a 3D video conversion apparatus which converts an input video into a 3D video using the depth estimation apparatus is described with reference to FIGS. 5 through 8.

Figure 5:
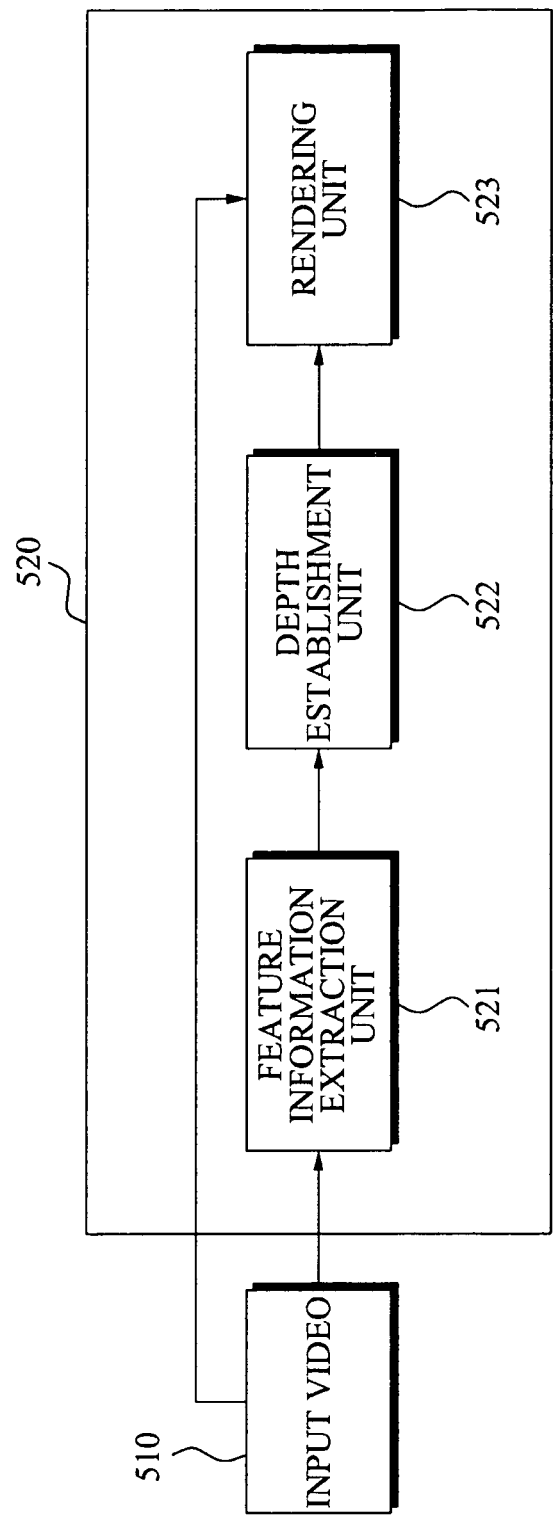
FIG. 5 is a diagram illustrating a structure of a 3D video conversion apparatus, according to one or more embodiments.

FIG. 5 is a diagram illustrating a structure of a 3D video conversion apparatus 520, according to one or more embodiments. The 3D video conversion apparatus 520 may include a feature information extraction unit 521, a depth establishment unit 522, and a rendering unit 523, for example.

When an input video 510 is provided to the 3D video conversion apparatus 520, a feature extraction unit 521 may extract at least one particular feature information of the input video 510 and provide the extracted at least one particular feature information to a depth establishment unit 522.

According to one or more embodiments, the input video may be a monocular video.

Also, according to one or more embodiments, the feature information may be at least one of edge information, color information, luminance information, motion information, and histogram information, for example.

The depth establishment unit 522 may establish a depth of the input video 510 based on the at least one particular feature information received from the feature information extraction unit 521.

The 3D video conversion apparatus 520 may convert the input video 510 into a 3D video by establishing the depth of the input video 510 based on the at least one particular feature information of the input video 510 and by rendering the 2D input video 510 using the depth.

According to one or more embodiments, the 3D video conversion apparatus 520 may be expanded in various embodiments in addition to the embodiments illustrated in FIG. 5. Various example embodiments of the 3D video conversion apparatus 520 are described with reference to FIGS. 6 through 8, noting that alternatives are equally available.

Figure 6:
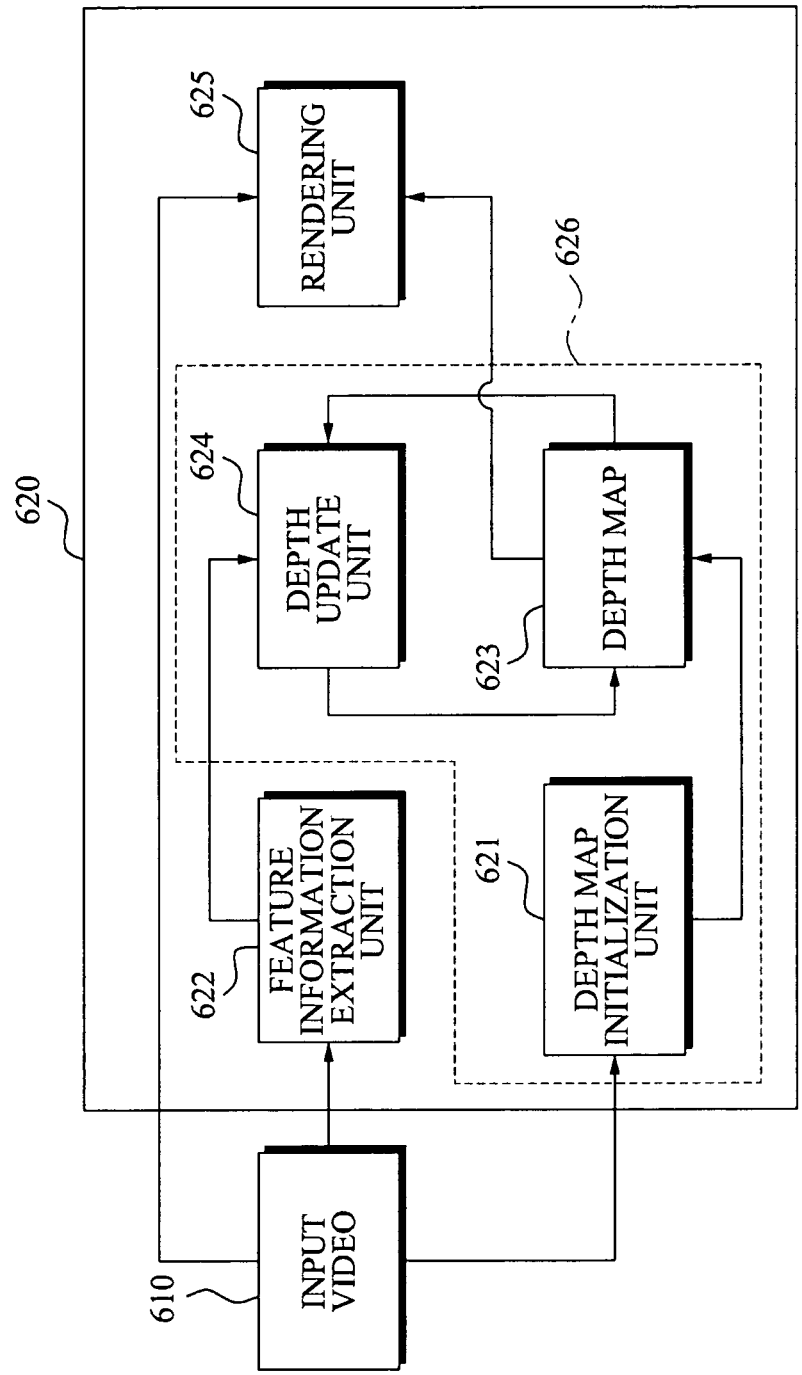
FIG. 6 is a diagram illustrating a structure of a 3D video conversion apparatus, according to one or more other embodiments.

FIG. 6 is a diagram illustrating a structure of a 3D video conversion apparatus 620, according to one or more other embodiments. The 3D video conversion apparatus 620 may include a feature information extraction unit 622, a rendering unit 625, and a depth establishment unit 626, for example. According to one or more embodiments, the depth establishment unit 626 may further include a depth map initialization unit 621 and a depth update unit 624, for example.

When the input video 610 is provided to the 3D video conversion apparatus 620, the depth map initialization unit 621 may establish an initial depth of at least one pixel of the input video 610, and store the initial depth in the depth map 623.

According to one or more embodiments, the input video 610 may be a monocular video.

Also, according to one or more embodiments, the depth map initialization unit 621 may establish the initial depth of each frame of a sequence of the input video 610, and store the initial depth in the depth map 623.

Also, according to one or more embodiments, the depth map initialization unit 621 may establish the initial depth according to the aforementioned Equation 1, or other features, for example.

The feature information extraction unit 622 may extract at least one particular feature information of the input video 610 and provide the extracted at least one particular feature information of the input video 610 to the depth update unit 624.

According to one or more embodiments, the at least one particular feature information may be at least one of edge information, color information, luminance information, motion information, and histogram information, for example.

The depth update unit 624 may calculate a final depth of the input video 610 by performing filtering based on the at least one particular feature information and the initial depth, and update the depth map 623 using the calculated depth.

According to one or more embodiments, the feature information extraction unit 622 may calculate a weight between at least one pixel of the input video 610 and adjacent pixels based on the at least one particular feature information.

Also, according to one or more embodiments, the feature information extraction unit 622 may calculate the weight so as to depend on similarities of feature information between the at least one pixel and the adjacent pixels.

Here, according to one or more embodiments, the feature information extraction unit 622 may calculate the weight according to the aforementioned Equation 2, for example.

Also, according to one or more embodiments, the depth update unit 624 may perform filtering based on the weight.

Here, according to one or more embodiments, the depth update unit 624 may perform the filtering according to the aforementioned Equation 3, for example.

The rendering unit 625 may render the input video 610 into a 3D video using the depth map 623 which is updated by the depth update unit 624.

According to one or more embodiments, the depth map initialization unit 621 may establish the initial depth using the at least one particular feature information, and store the initial depth in the depth map 623.

Accordingly, the depth map initialization unit 621 may establish an initial depth in which smoothing may be performed.

Consequently, the 3D video conversion unit 620 may reduce complexity of iterated operations that may be performed for the depth update unit 624 to smooth depths stored in the depth map 623 by establishing an initial depth in which smoothing may be performed via the depth map initialization unit 621.

In this instance, according to one or more embodiments, the 3D video conversion apparatus 620 may further include additional feature information extraction units in addition to the feature information extraction unit 622.

Here, the depth map initialization unit 621 may establish the initial depth by receiving the at least one particular feature information from another feature information extraction unit.

According to one or more embodiments, the 3D video conversion unit 620 may further include a post-processing unit, the post-processing unit post-processing the input video 610 to be converted into a 3D video having a smoother depth.

Also, according to one or more embodiments, the 3D video conversion apparatus 620 may further include a pre-processing unit.

The pre-processing unit may convert a color space of the input video 610, or extract a motion vector of the input video 610 by decoding the input video 610 when the input video 610 is a video which is encoded into a predetermined video stream.

When the pre-processing unit performs a function of converting the color space of the input video 610, the feature information extraction unit 622 may extract more accurate feature information of the input video 610.

As an example, when the input video 610 is a video consisting of a YCbCr color space or of a red, green and blue color space, the pre-processing unit may convert the color space of the input video 610 into a L*U*V* color space so that the feature information extraction unit 622 may extract more accurate feature information of the input video 610.

Also, when the pre-processing unit performs a function of extracting a motion vector of the input video 610 by decoding the input video 610, the feature information extraction unit 622 may extract feature information of the input video 610 using the motion vector, for example.

Figure 7:
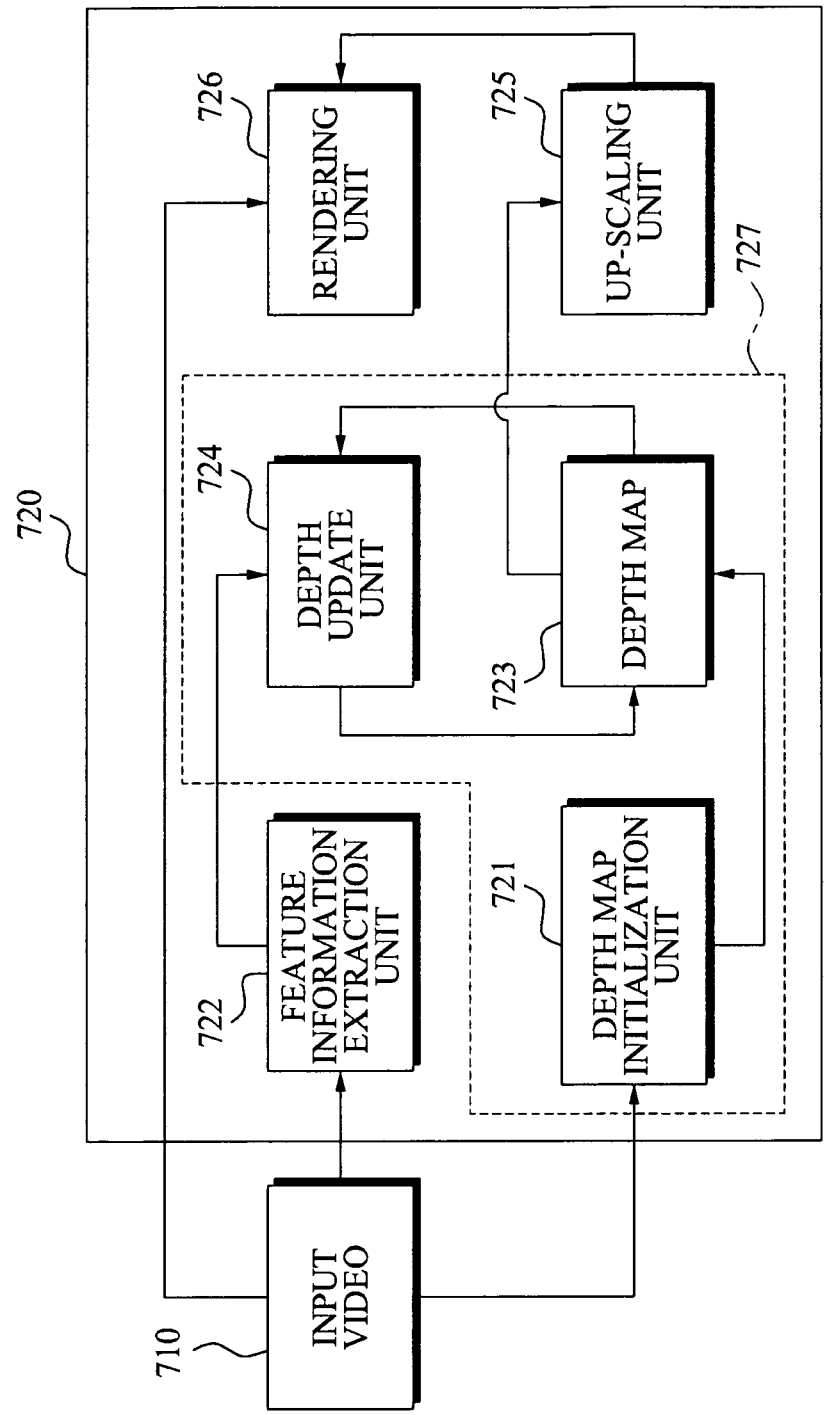
FIG. 7 is a diagram illustrating a structure of a 3D video conversion apparatus, according to still one or more other embodiments.

FIG. 7 is a diagram illustrating a structure of a 3D video conversion apparatus 720, according to still one or more other embodiments.

The 3D video conversion apparatus 720 may include a feature information extraction unit 722, an up-scaling unit 725, a rendering unit 726, and a depth establishment unit 727, for example.

According to one or more embodiments, the depth establishment unit 727 may include a depth map initialization unit 721 and a depth update unit 724, for example.

The depth map initialization unit 721 may establish an initial depth of at least one block by dividing a plurality of pixels of an input video 710 into at least one block, and store the initial depth in the depth map 723.

As an example, when a plurality of pixels of the input video 710 are a, b, c, d, e, and f, the depth map initialization unit 721 may divide adjacent pixels of the plurality of pixels into at least one bock, such as (a, b), (c, d), or (e, f), establish initial depths of the at least one block, and store the initial depths in the depth map 723.

According to one or more embodiments, the input video 710 may be a monocular video.

Also, according to one or more embodiments, the depth map initialization unit 721 may establish the initial depth according to the aforementioned Equation 1, or other features, for example.

Here, (x, y) indicates coordinates of the at least one block.

The feature information extraction unit 722 may extract at least one particular feature information of the input video 710 and provide the extracted at least one particular feature information of the input video 610 to the depth update unit 724.

According to one or more embodiments, the at least one particular feature information of the input video 710 extracted in the feature information extraction unit 722 may be at least one of edge information, color information, luminance information, motion information, or histogram information, for example.

The depth update unit 724 may calculate a second depth of the at least one block by performing filtering based on the at least one particular feature information and the initial depth, and update the depth map 723 using the second depth.

According to one or more embodiments, the feature information extraction unit 722 may calculate a weight between the at least one block and each of adjacent blocks based on the at least one particular feature information.

Here, according to one or more embodiments, the feature information extraction unit 722 may calculate the weight so as to depend on similarities of feature information between the at least one block and each of the adjacent blocks.

In this instance, according to one or more embodiments, the feature information extraction unit 722 may calculate the weight according to the aforementioned Equation 2, for example.

Here, (x, y) indicates coordinates of the at least one block, and (x', y') indicates coordinates of blocks adjacent to the at least one block.

Also, according to one or more embodiments, the depth update unit 724 may perform the filtering based on the weight.

In this instance, according to one or more embodiments, the depth update unit 724 may perform the filtering according to the aforementioned Equation 3, for example.

Here, (x, y) indicates coordinates of the at least one block, and (x', y') indicates coordinates of blocks adjacent to the at least one block.

The up-scaling unit 725 may up-scale the updated depth map 723 based on the plurality of pixels.

The rendering unit 726 may render the input video 710 into a 3D video using the up-scaled depth map.

Consequently, the depth estimation apparatus 720 may divide the plurality of pixels of the input video 710 into at least one block, generate the depth map 723, and up-scale the generated depth map 723, thereby converting the input video 710 into a 3D video through comparatively simple operations.

According to one or more embodiments, the depth map initialization unit 721 may establish an initial depth based on the at least one particular feature information, and store the initial depth in the depth map 723.

Accordingly, the depth map initialization unit 721 may establish an initial depth in which smoothing may be performed.

Consequently, the depth estimation apparatus 720 may reduce complexity of iterated operations that may be performed for the depth update unit 724 to smooth depths stored in the depth map 723 by establishing an initial depth in which smoothing may be performed via the depth map initialization unit 721.

In this instance, according to one or more embodiments, the depth estimation apparatus 720 may further include additional feature information extraction units in addition to the feature information extraction unit 722.

Here, the depth map initialization unit 721 may establish the initial depth by receiving at least one particular feature information from another feature extraction information unit.

According to one or more embodiments, the 3D video conversion unit 720 may further include a post-processing unit, the post-processing unit post-processing up-scaled depth map to convert the input video 710 into a 3D video having a smoother depth.

Also, according to one or more embodiments, the depth estimation apparatus 720 may further include a pre-processing unit.

The pre-processing unit may convert a color space of the input video 710 or may extract a motion vector of the input video 710 by decoding the input video 710 when the input video 710 is a video which is encoded into a predetermined video stream.

When the pre-processing unit 221 performs a function of converting a color space of the input video 210, the feature information extraction unit 223 may extract more accurate feature information of the input video 210.

When the pre-processing unit performs a function of converting the color space of the input video 710, the feature information extraction unit 722 may extract more accurate feature information of the input video 710.

As an example, when the input video 710 is a video consisting of a YCbCr color space or of a red, green and blue color space, the pre-processing unit may convert the color space of the input video 710 into a L*U*V* color space so that the feature information extraction unit 722 may extract more accurate feature information of the input video 710.

Also, when the pre-processing unit performs a function of extracting a motion vector of the input video 710 by decoding the input video 710, the feature information extraction unit 722 may extract feature information of the input video 710 using the motion vector.

Figure 8:
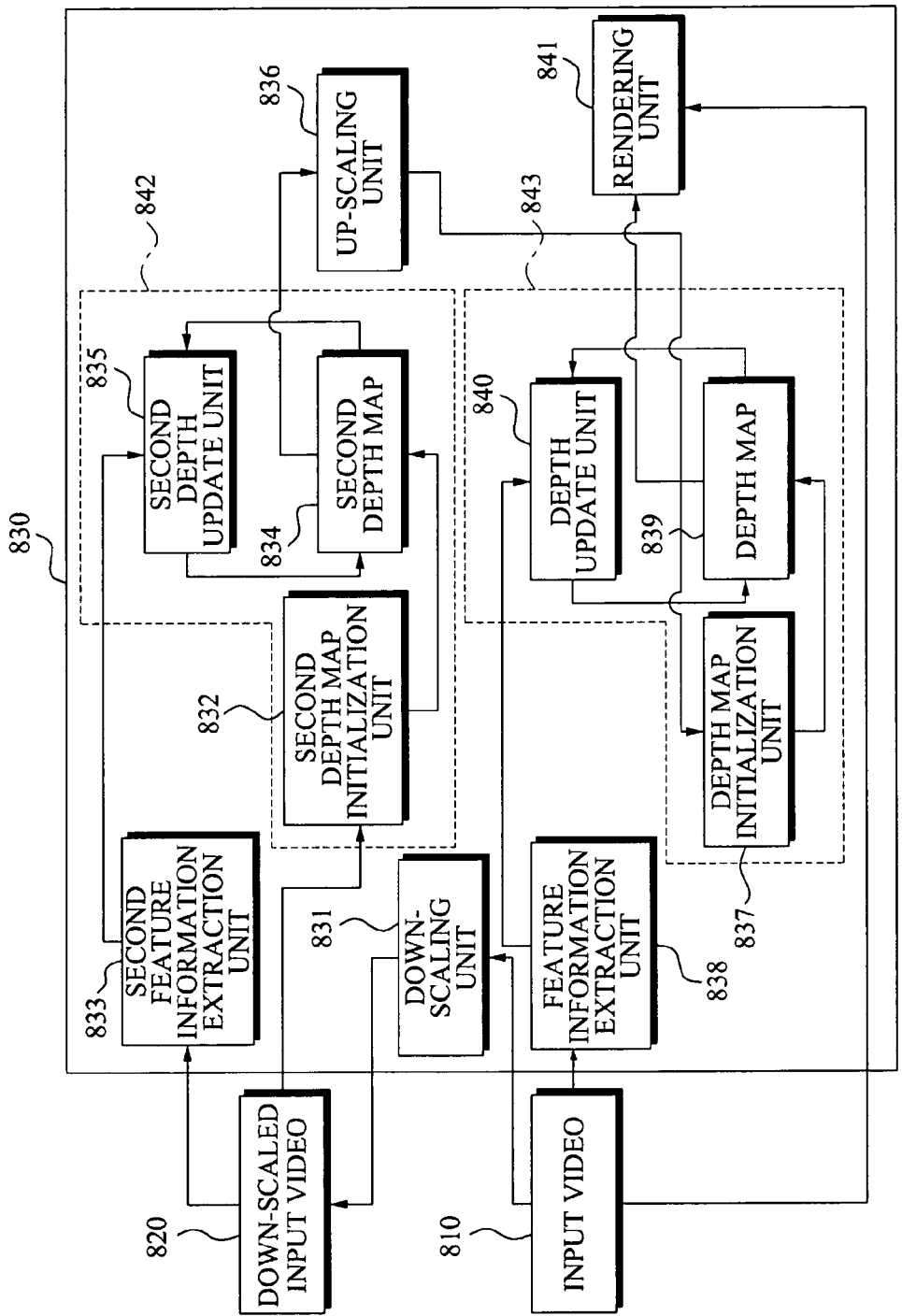
FIG. 8 is a diagram illustrating a structure of a 3D video conversion apparatus, according to yet one or more other embodiments.

FIG. 8 is a diagram illustrating a structure of a 3D video conversion apparatus 830, according to yet one or more other embodiments. The 3D video conversion apparatus 830 may include a feature information extraction unit 838, a depth establishment unit 843, and a rendering unit 841, for example. According to one or more embodiments, the depth establishment unit 843 may further include a depth map initialization unit 837 and a depth update unit 840, for example.

The depth map initialization unit 837 may establish an initial depth of at least one pixel of an input video 810 and store the initial depth of at least one pixel of an input video 810 in the depth map 839.

According to one or more embodiments, the input video 810 may be a monocular video.

The feature information extraction unit 838 may extract at least one particular feature information of the input video 810 and provide the at least one particular feature information of the input video 810 to the depth update unit 840.

According to one or more embodiments, the at least one particular feature information of the input video 810 may be at least one of edge information, color information, luminance information, motion information, or histogram information, for example.

The depth update unit 840 may calculate a depth of the input video 810 by performing filtering based on the at least one particular feature information and the initial depth, and update the depth map 839 using the depth.

According to one or more embodiments, the feature information extraction unit 838 may calculate a weight between the at least one pixel of the input video 810 and each of adjacent pixels based on the at least one particular feature information.

Here, according to one or more embodiments, the feature information extraction unit 838 may calculate the weight so as to depend on similarities of feature information between the at least one pixel and each of the adjacent pixels.

In this instance, according to one or more embodiments, the feature information extraction unit 838 may calculate the weight according to the aforementioned Equation 2, for example.

Also, according to one or more embodiments, the depth update unit 840 may perform the filtering based on the weight.

Here, according to one or more embodiments, the depth update unit 840 may perform the filtering according to the aforementioned Equation 3, for example.

The rendering unit 841 may render the input video 810 into a 3D video using an updated depth map 839.

As described above, the depth estimation apparatus 830 may estimate the depth of the input video 810 by updating the depth map 839 using the at least one particular feature information when the depth map initialization unit 837 establishes the initial depth.

Also, according to one or more embodiments, the depth estimation apparatus 830 may simplify operations for estimating the depth of the input video 810 by down-scaling the input video 810, estimating a second depth of the down-scaled input video, and using the second depth as the initial depth.

In the related context, the depth estimation apparatus 830 may further include a down-scaling unit 831, a second feature information extraction unit 833, a second depth establishment unit 842, and an up-scaling unit 836, for example.

According to one or more embodiments, the second depth establishment unit 842 may include a second depth map initialization unit 832 and a second depth update unit 835, for example.

The down-scaling unit 831 may down-scale the input video 810 received in the 3D video conversion apparatus 830 to a predetermined resolution.

As an example, when a resolution of the input video is 1024×768, the downscaling unit 831 may down-scale the resolution of the input video 810 to 800×600.

According to one or more embodiments, the input video 810 may be a monocular video.

The second depth map initialization unit 832 may establish a second depth of the at least one pixel of an input video 820 which is down-scaled by the down-scaling unit 831 and store the second initial depth in the second depth map 834.

According to one or more embodiments, the second depth map initialization unit 832 may establish the second initial depth according to the aforementioned Equation 1, for example, or other features.

The second feature information extraction unit 833 may extract at least one particular second feature information of the down-scaled input video 820 and provide the extracted at least one particular second feature information of the down-scaled input video 820 to the second depth update unit 835.

According to one or more embodiments, the at least one particular second feature information extracted by the second feature information extraction unit 833 may be at least one of edge information, color information, luminance information, motion information, or histogram information, for example.

The second depth update unit 835 may calculate a second depth of the down-scaled input video 820 by performing filtering based on the at least one particular second feature information and the second initial depth, and update the second depth map 834 using the second depth.

According to one or more embodiments, the second feature information extraction unit 833 may calculate a second weight between at least one pixel of the down-scaled input video 820 and each of adjacent pixels based on the at least one particular second feature information.

According to one or more embodiments, the second feature information extraction unit 833 may calculate the second weight so as to depend on similarities of feature information between the at least one pixel and adjacent pixels.

Here, according to one or more embodiments, the second feature information extraction unit 833 may calculate the second weight according to the aforementioned Equation 2, for example.

Also, according to one or more embodiments, the second depth update unit 835 may perform the filtering based on the second weight.

Here, according to one or more embodiments, the second depth update unit 835 may perform the filtering according to the aforementioned Equation 3, for example.

The up-scaling unit 836 may up-scale the updated second depth map 834 based on a resolution of the input video 810 and provide the up-scaled depth map 834 to the depth map initialization unit 837.

Here, according to one or more embodiments, the up-scaling unit 836 may up-scale the second depth map 834 based on the at least one particular second feature information and the at least one particular feature information, and provide the up-scaled second depth map to the depth map initialization unit 837.

When the up-scaling unit 836 up-scales and provides the second depth map 834, the depth map initialization unit 837 may establish a depth stored in the up-scaled second depth map as an initial depth of the at least one pixel of the input video 810, and store the initial depth in the depth map 839.

As described above, by establishing a depth in which filtering may be performed as the initial depth, complexity of operations that may be performed for the depth update unit 840 to update the depth map 839 by filtering a depth of the input video 810 may be reduced.

Consequently, the 3D video conversion apparatus 830 may reduce overall operations for estimating the depth of the input video 810 by down-scaling the input video 810 and generating a final depth map using a combination of access methods which generate an initial depth map.

Here, the 3D video conversion apparatus 830 is illustrated in FIG. 8 as generating the depth map by down-scaling the input video 810 once, however embodiments are not limited to this.

That is, according one or more embodiments, the 3D video conversion apparatus 830 down-scales the input video 810 n times, generates a depth map from an $n^{th}$ down-scaled input video and up-scales the generated depth map, thereby being used as an initial depth map for generating a depth map of an $(n-1)^{th}$ down-scaled input video, for example. Also, in the case of a depth map of the $(n-1)^{th}$ down-scaled input video, the depth map of the $(n-1)^{th}$ down-scaled input video is up-scaled, thereby using as an initial depth map for generating a depth map of an $(n-2)^{th}$ down-scaled input video, also as an example.

Consequently, the 3D video conversion apparatus 430 may simplify operations for estimating the depth of the input video 810 by using a depth map, generated by repeatedly performing the above described operations, as the initial depth map for generating the depth map of the input video 810.

Figure 9:
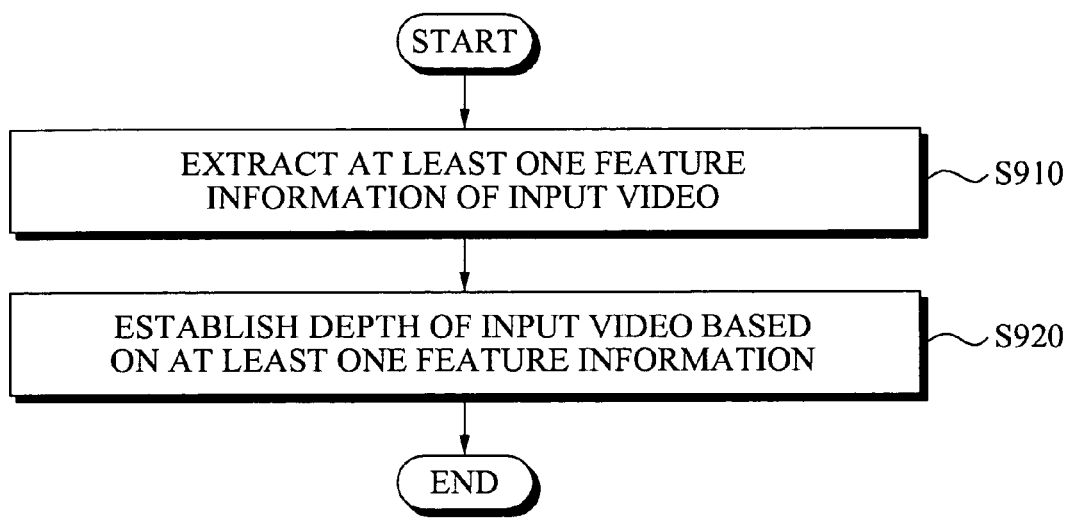
FIG. 9 is flowchart illustrating a depth estimation method, according to one or more embodiments.

FIG. 9 is flowchart illustrating a depth estimation method, according to one or more embodiments.

In operation S910, at least one particular feature information of an input video is extracted.

According to one or more embodiments, the at least one particular feature information may be at least one of edge information, color information, luminance information, motion information, or histogram information, for example.

In operation S920, a depth of the input video is established based on the at least one particular feature information extracted in operation S910.

According to one or more embodiments, the depth estimation method may be expanded in various embodiments in addition to the method illustrated in FIG. 9. Therefore, example various embodiments regarding the depth estimation method are described with reference to FIGS. 10 through 12, noting that additional embodiments are equally available.

Figure 10:
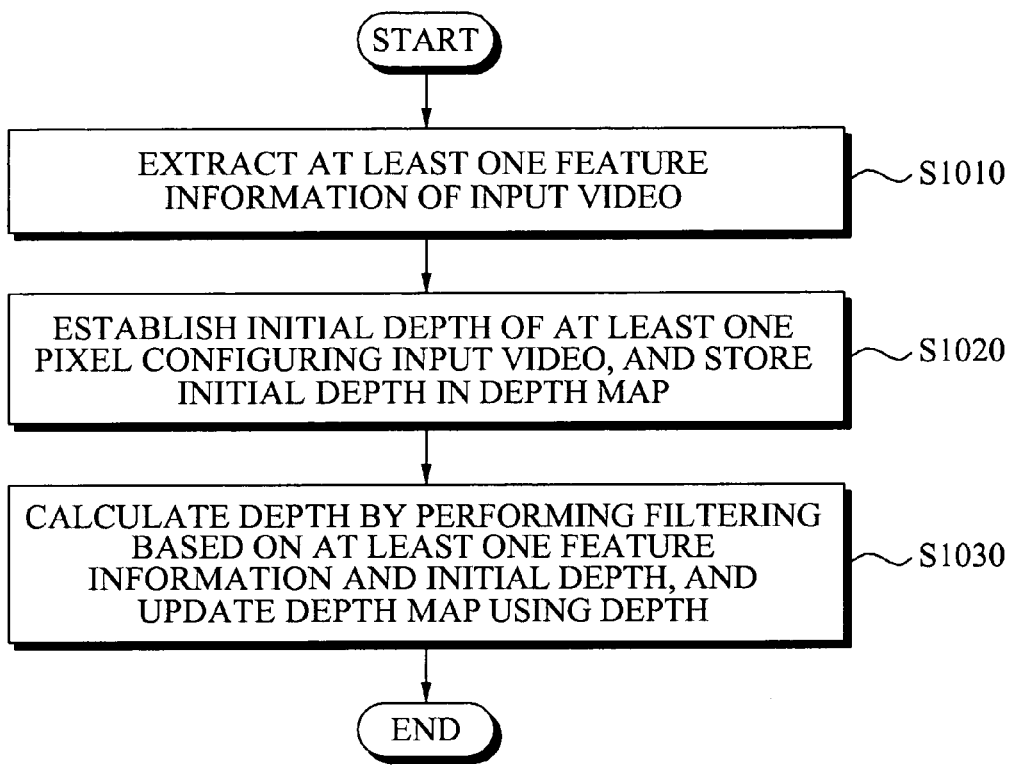
FIG. 10 is a flowchart illustrating a depth estimation method, according to one or more other embodiments.

FIG. 10 is a flowchart illustrating a depth estimation method, according to one or more other embodiments.

In operation S1010, at least one particular feature information of an input video is extracted.

The at least one particular feature information of the input video may be at least one of edge information, color information, luminance information, motion information, or histogram information, for example.

In operation S1020, an initial depth of at least one pixel is established and the initial depth is stored in a depth map.

According to one or more embodiments, the initial depth may be established according to the aforementioned Equation 1, for example, or other features, in operation S1020.

In operation S1030, a final depth of the input video is calculated by performing filtering based on the at least one particular feature information and the initial depth, and the depth map is updated using the depth.

According to one or more embodiments, operation S1010 may include an operation of calculating a weight between the at least one pixel and adjacent pixels based on the at least one particular feature information based on the at least one particular feature information in operation S1010.

Here, according to one or more embodiments, the weight may be calculated according to the aforementioned Equation 2, for example.

Also, according to one or more embodiments, the filtering may be performed based on the weight in operation S1030.

Here, according to one or more embodiments, the filtering may be performed according to the aforementioned Equation 3, for example, in operation S1030.

Figure 11:
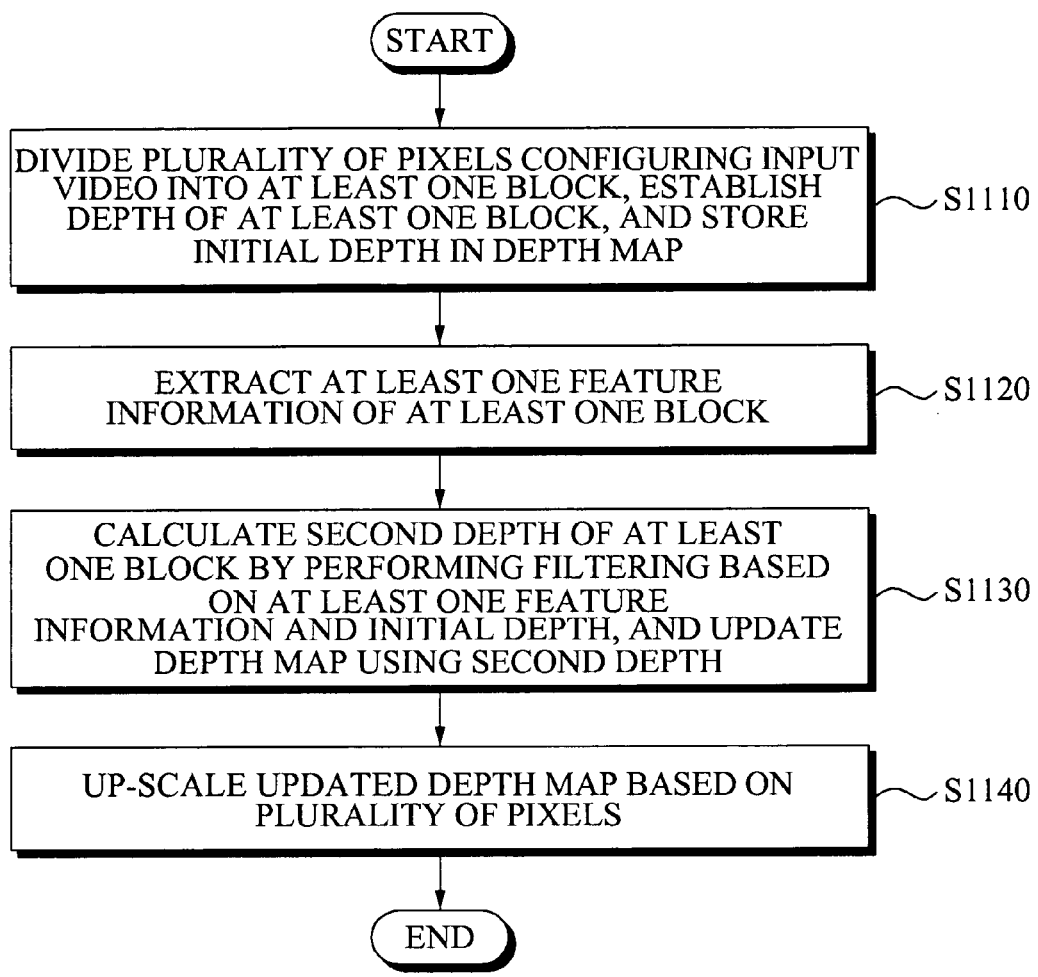
FIG. 11 is a flowchart illustrating a depth estimation method, according to still one or more other embodiments.

FIG. 11 is a flowchart illustrating a depth estimation method, according to still one or more other embodiments.

In operation S1110, a plurality of pixels of the input video are divided into at least one block, an initial depth of the at least one block is established, and the initial depth is stored in a depth map.

According to one or more embodiments, the initial depth may be established according to the aforementioned Equation 1, for example, or other features, in operation S1110.

Here, (x, y) indicates coordinates of the at least one block.

In operation S1120, at least one particular feature information of the at least one block is extracted.

According to one or more embodiments, the at least one particular feature information of the at least one block may be at least one of edge information, color information, luminance information, motion information, or histogram information, for example.

In operation S1130, a second depth of the at least one block is calculated by performing filtering based on the at least one particular feature information and the initial depth, and the depth map is updated using the second depth.

According to one or more embodiments, operation S1120 may include an operation of calculating a weight between the at least one block and adjacent blocks based on the at least one particular feature information.

In this instance, according to one or more embodiments, the weight may be calculated according to the aforementioned Equation 2, for example.

Here, (x, y) indicates coordinates of the at least one block, and (x', y') indicates coordinates of blocks adjacent to the at least one block.

Also, according to one or more embodiments, the filtering may be performed based on the weight in operation S1130.

In this instance, according to one or more embodiments, the filtering may be performed according to the aforementioned Equation 3, for example, in operation S1130.

Here, (x, y) indicates coordinates of the at least one block, and (x', y') indicates coordinates of blocks adjacent to the at least one block.

In operation S1140, the updated depth map is up-scaled based on the plurality of pixels.

Figure 12:
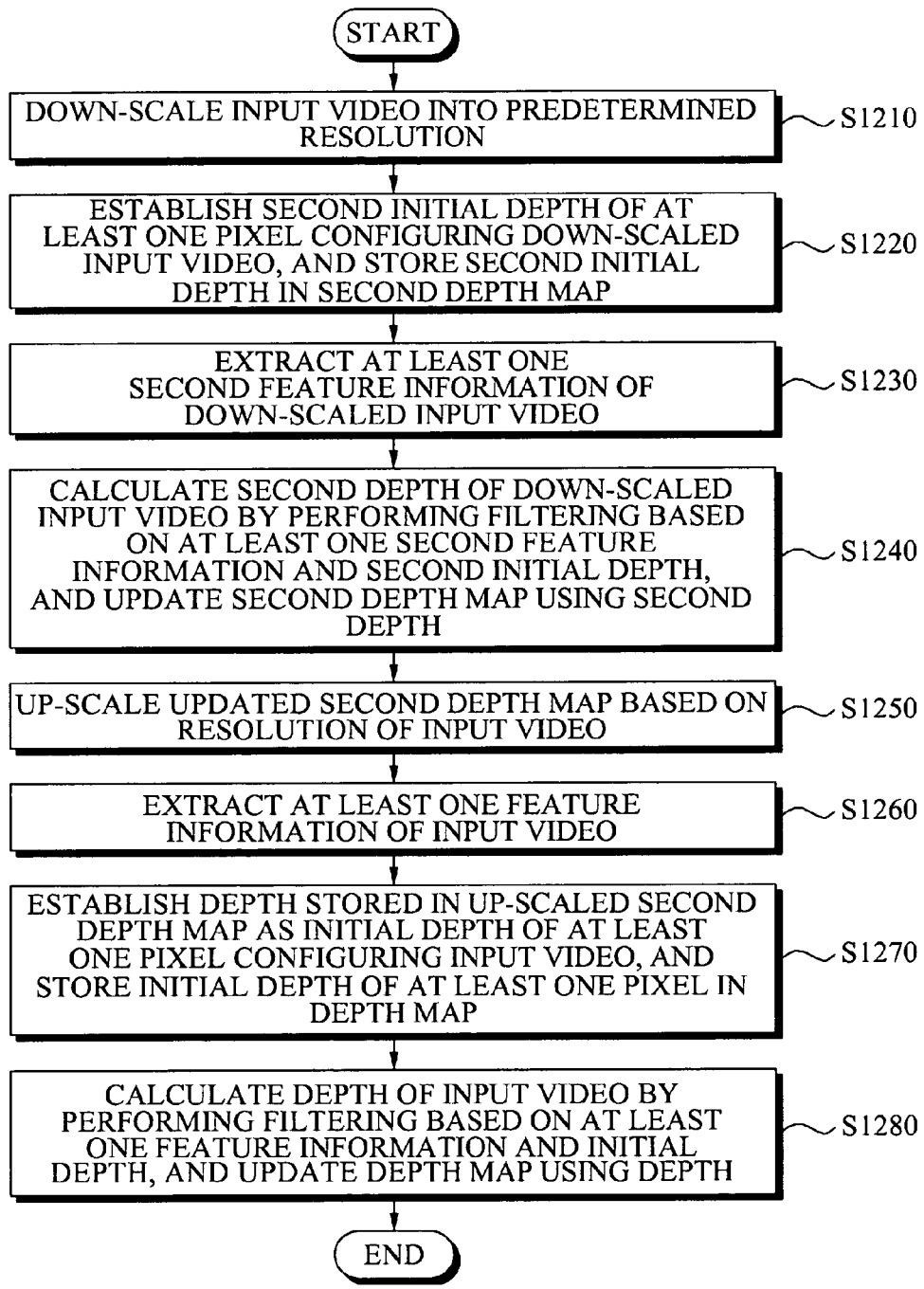
FIG. 12 is a flowchart illustrating a depth estimation method, according to yet one or more other embodiments.

FIG. 12 is a flowchart illustrating a depth estimation method, according to yet one or more other embodiments.

In operation S1210, an input video is down-scaled into a predetermined resolution.

In operation S1220, a second initial depth of at least one pixel of the down-scaled input video is established, and the second initial depth is stored in a second depth map.

According to one or more embodiments, the second initial depth may be established according to the aforementioned Equation 1, for example, or other features, in operation S1220.

In operation S1230, at least one second particular feature information of the down-scaled input video is extracted.

According to one or more embodiments, the at least one particular second feature information may be at least one of edge information, color information, luminance information, motion information, or histogram information, for example.

In operation S1240, a second depth of the down-scaled input video may be calculated by performing filtering based on the at least one particular second feature information and the second initial depth is calculated, and the second depth map is updated using the second depth.

According to one or more embodiments, operation 1230 may include an operation of calculating a second weight between the at least one pixel and the adjacent pixels based on the at least one particular second feature information.

In this instance, according to one or more embodiments, the second weight may be calculated according to the aforementioned Equation 2, for example.

Also, according to one or more embodiments, the filtering may be performed based on the second weight in operation S1240.

In this instance, according to one or more embodiments, the filtering may be performed according to the aforementioned Equation 3, for example, in operation S1240.

In operation S1250, the updated second depth map is up-scaled based on a resolution of the input video.

In operation S1260, at least one particular feature information of the input video is extracted.

According to one or more embodiments, the at least one particular feature information may be at least one of edge information, color information, luminance information, motion information, or histogram information, for example.

In operation S1270, a depth stored in the up-scaled second depth map is established as initial depth of at least one pixel of the input video, and the initial depth of at least one pixel is stored in the depth map.

In operation S1280, a final depth of the input video is calculated by performing filtering based on the at least one particular feature information and the initial depth, and the depth map is updated using the depth.

According to one or more embodiments, operation S1260 may include an operation of calculating a weight between the at least one pixel and adjacent pixels based on at the least one feature information.

In this instance, according to one or more embodiments, the weight may be calculated according to the aforementioned Equation 2, for example.

Also, according to one or more embodiments, the filtering may be performed based on the weight in operation S1280.

In this instance, according to one or more embodiments, the filtering may be performed according to the aforementioned Equation 3, for example, in operation S1280.

Various embodiments regarding the depth estimation method have been described with reference to FIGS. 9 through 12. Hereinafter, various embodiments regarding a 3D video conversion method which converts an input video into a 3D video using the depth estimation method are described with reference to FIGS. 13 through 16, noting that further embodiments are equally available.

Figure 13:
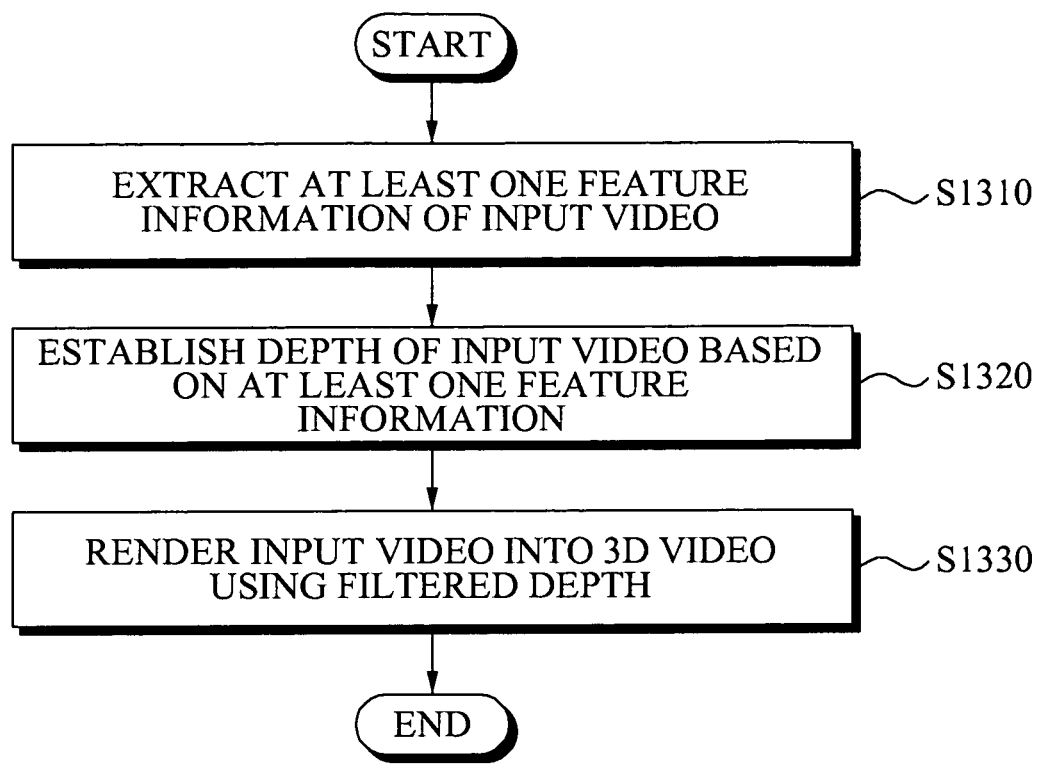
FIG. 13 is a flowchart illustrating a 3D video conversion method, according to one or more embodiments.

FIG. 13 is a flowchart illustrating a 3D video conversion method, according to one or more embodiments.

In operation, S1310, at least one particular feature information of an input video is extracted.

According to one or more embodiments, the at least one particular feature information may be at least one of edge information, color information, luminance information, motion information, and histogram information, for example.

In operation S1320, a depth of the input video is established based on the at least one particular feature information extracted in operation S1310.

In operation S1330, the input video is rendered into a 3D video using the filtered depth.

According to one or more embodiments, the 3D video conversion method may be variously expanded, in addition to the method illustrated in FIG. 13. Hereinafter, the various example embodiments regarding the 3D video conversion method are described with reference to FIGS. 14 through 16, noting that alternative embodiments are equally available.

Figure 14:
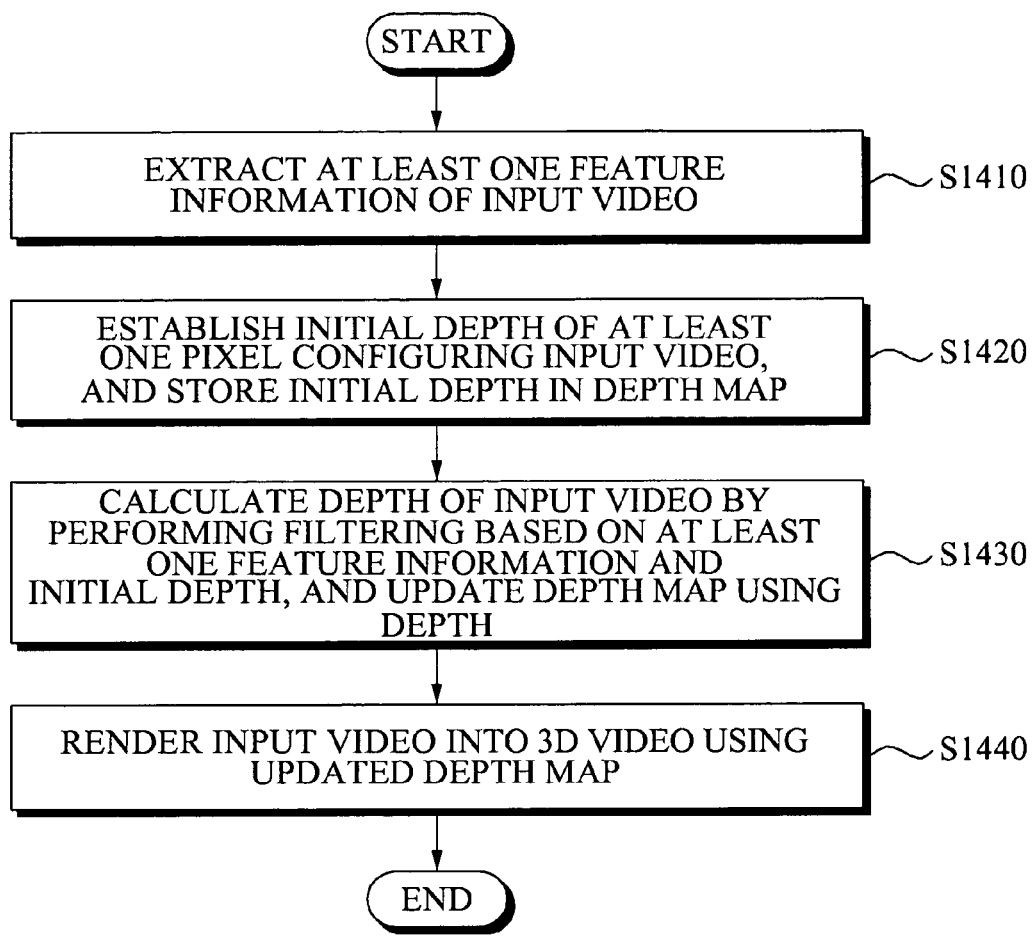
FIG. 14 is a flowchart illustrating a 3D video conversion method, according to one or more other embodiments.

FIG. 14 is a flowchart illustrating a 3D video conversion method, according to one or more other embodiments.

In operation S1410, at least one particular feature information of an input video is extracted.

According to one or more embodiments, the at least one particular feature information of the input video may be at least one of edge information, color information, luminance information, motion information, or histogram information, for example.

In operation S1420, an initial depth of at least one pixel of the input video is established and the initial depth is stored in a depth map.

In operation S1430, a final depth of the input video is calculated by performing filtering based on the at least one particular feature information and the initial depth, and the depth map is updated using the depth.

According to one or more embodiments, operation S1410 may include an operation of calculating a weight between the at least one pixel and adjacent pixels based on the at least one particular feature information.

Here, according to one or more embodiments, the weight may be calculated according to the aforementioned Equation 2, for example.

Also, according to one or more embodiments, the filtering may be performed based on the weight in operation S1430.

Here, according to one or more embodiments, the filtering may be performed according to the aforementioned Equation 3, for example.

In operation S1440, the input video is rendered into a 3D video using the updated depth map.

Figure 15:
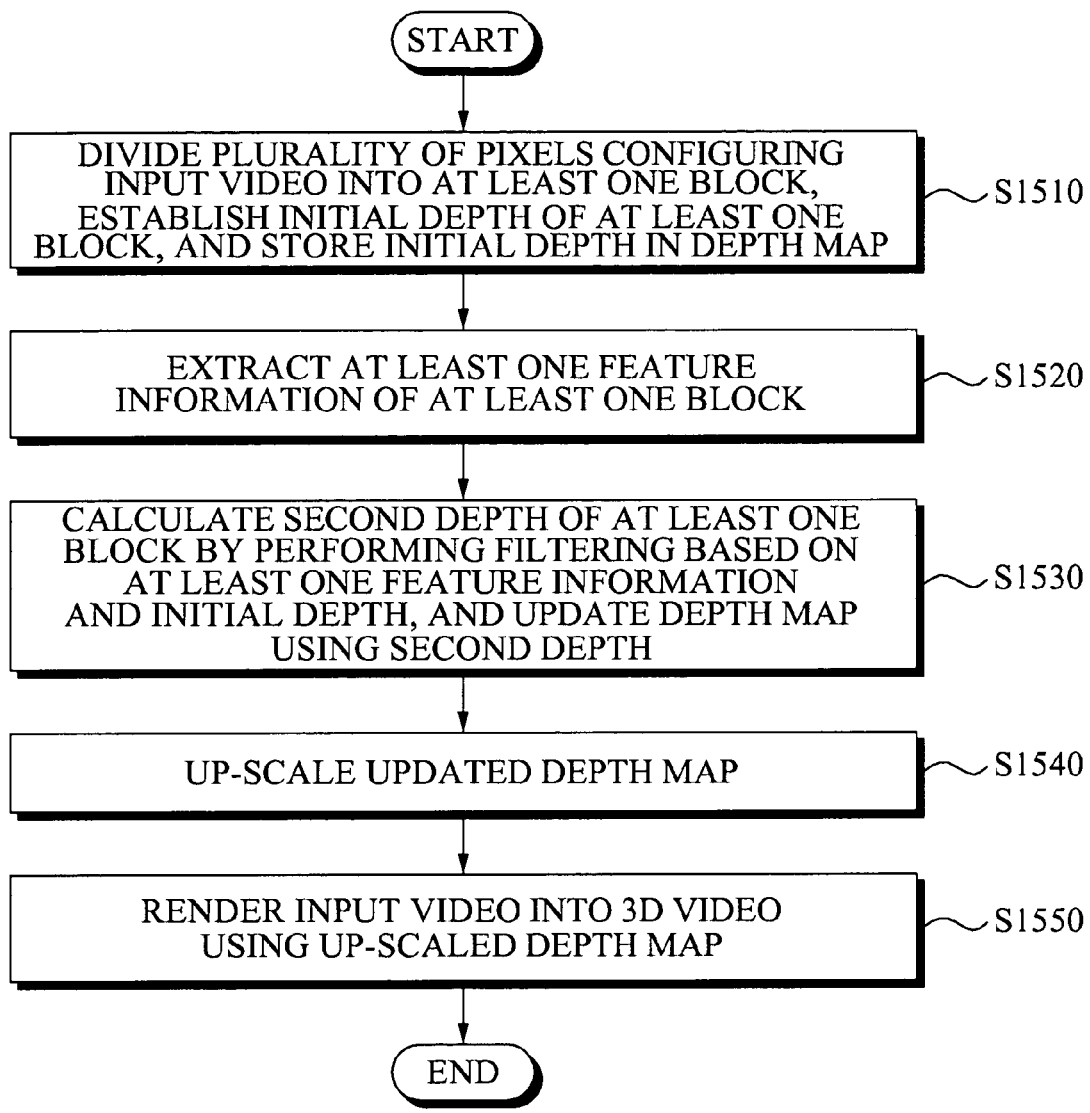
FIG. 15 is a flowchart illustrating a 3D video conversion method, according to still one or more other embodiments.

FIG. 15 is a flowchart illustrating a 3D video conversion method, according to still one or more other embodiments.

In operation S1510, a plurality of pixels of an input video are divided into at least one block, an initial depth of the at least one block is established, and the initial depth is stored in a depth map According to one or more embodiments, the initial depth may be established according to the aforementioned Equation 1, for example, or other features, in operation S1510.

Here, (x, y) indicates coordinates of the at least one block.

In operation S1520, at least one particular feature information of the at least one block is extracted.

According to one or more embodiments, the at least one particular feature information of the at least one block may be at least one of edge information, color information, luminance information, motion information, or histogram information, for example.

In operation S1530, a second depth of the at least one block is calculated by performing filtering based on at least one particular feature information and the initial depth, and the depth map is updated using the second depth.

According to one or more embodiments, operation S1520 may include an operation of calculating a weight between the at least one block and adjacent blocks based on the at least one particular feature information.

Here, according to one or more embodiments, the weight may be calculated according to the aforementioned Equation 2, for example.

Here, (x, y) indicates coordinates of the at least one block, and (x', y') indicates coordinates of blocks adjacent to the at least one block.

Also, according to one or more embodiments, the filtering may be performed based on the weight in operation S1530.

Here, according to one or more embodiments, the filtering may be performed according to the aforementioned Equation 3, for example, in operation S1530.

Here, (x, y) indicates coordinates of the at least one block, and (x', y') indicates coordinates of blocks adjacent to the at least one block.

In operation S1540, the updated depth map is up-scaled based on the plurality of pixels.

In operation S1550, the input video is rendered into a 3D video using the up-scaled depth map.

Figure 16:
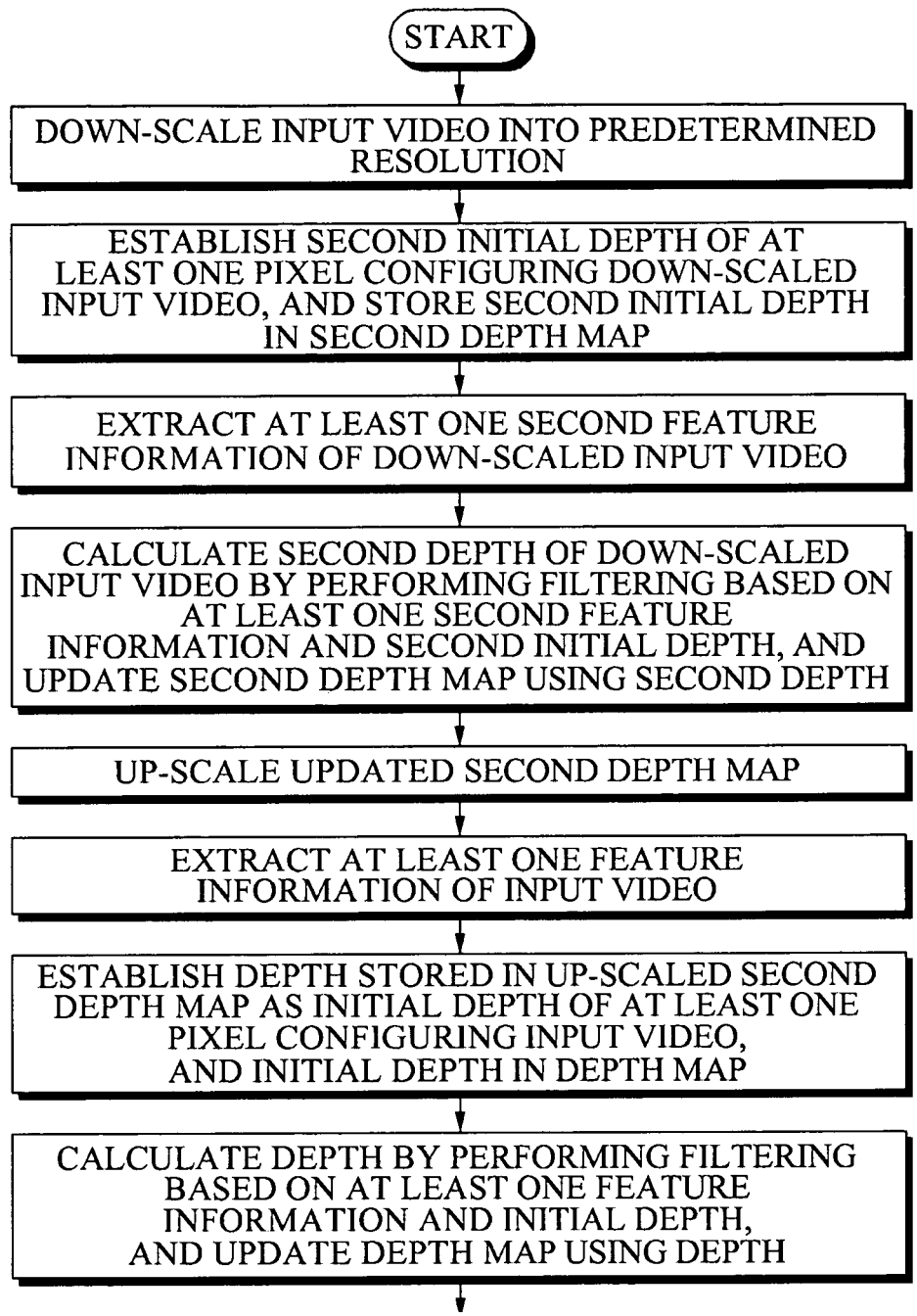
FIG. 16 is a flowchart illustrating a 3D video conversion method, according to yet one or more other embodiments.

FIG. 16 is a flowchart illustrating a 3D video conversion method, according to one or more other embodiments.

In operation S1610, an input video is down-scaled into a predetermined resolution.

In operation S1620, a second initial depth of at least one pixel of the down-scaled input video is established, and the second initial depth is stored in a second depth map.

According to one or more embodiments, the second initial depth may be established according to the aforementioned Equation 1, for example, or other features, in operation S1620.

In operation S1630, at least one particular second feature information of the down-scaled input video is extracted.

According to one or more embodiments, at least one particular second feature information may be at least one of edge information, color information, luminance information, motion information, or histogram information, for example.

In operation S1640, a second depth of the down-scaled input video is calculated by performing filtering based on the at least one particular second feature information and the second initial depth, and the second depth map is updated using the second depth.

According to one or more embodiments, operation S1630 may include an operation of calculating a second weight between the at least one pixel and adjacent pixels based on the at least one particular second feature information.

In this instance, according to one or more embodiments, the second weight may be calculated according to the aforementioned Equation 2, for example.

Also, according to one or more embodiments, the filtering may be performed based on the second weight in operation S1640.

According to one or more embodiments, the filtering may be performed according to the aforementioned Equation 3, for example, in operation S1640.

In operation S1650, the updated second depth map is up-scaled based on a resolution of the input video.

In operation S1660, at least one particular feature information of the input video is extracted.

According to one or more embodiments, the at least one feature particular information may be at least one of edge information, color information, luminance information, motion information, and histogram information, for example.

In operation S1670, a depth stored in the up-scaled second depth map is established as an initial depth of at least one pixel of the input video, and the initial depth of the at least one pixel is stored in a depth map.

In operation S1680, a final depth of the input video is calculated by performing filtering based on the at least one particular feature information and the initial depth, and the depth map is updated using the depth.

According to one or more embodiments, operation S1660 may include an operation of calculating a weight between the at least one pixel and adjacent pixels based on the at least one particular feature information.

Here, according to one or more embodiments, the weight may be calculated according to the aforementioned Equation 2, for example.

Also, according to one or more embodiments, the filtering may be performed based on the second weight in operation S1680.

Here, according to one or more embodiments, the filtering may be performed according to the aforementioned Equation 3, for example.

In operation S1690, the input video is rendered into a 3D video using the updated depth map.

In addition to the above, one or more embodiments may include products accomplishing the same, such as 3D displays (e.g., televisions, monitors, mobile devices, etc.) and studio post-production systems, for example. The estimated depth may equally be beneficial for other devices, such as in enhancing traditional image processing systems and frame rate conversion devices. Estimated depth may also be an additional variable for algorithms for computer vision applications, including object detection, recognition, and even encoding in an encoder preferentially encoding slices or objects of an image or frames before other slices or objects, for example.

The depth estimation method and 3D video conversion method according to one or more of the above-described embodiments may be recorded in computer-readable media including computer readable code or instructions to implement various operations embodied by a computer or implementable by one or more processing devices. The media may also include, in combination with the computer readable code, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform instructions, such as read-only memory (ROM), random access memory (RAM), flash memory, and the like. Examples of such coding or instructions include both machine code, such as produced by a compiler, and files containing higher level code that may be executed by the computer or one or more processing devices using an interpreter, for example.

While aspects of the present invention has been particularly shown and described with reference to differing embodiments thereof, it should be understood that these exemplary embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. An apparatus for estimating depth to convert a two-dimensional (2-D) monocular video into a stereoscopic video, the apparatus comprising:
    a feature information extraction unit to extract at least one feature information from a single input image, the feature information being independent of any pre-established depth values of the input image; and
    a depth establishment unit to establish a depth of a portion of the input image based on the at least one feature information with regard to the portion of the input image, the portion being less than the entire image,
    wherein the feature information extraction unit calculates a weight so as to depend on similarities of feature information between the at least one pixel of the input image and adjacent pixels within the input image based on the at least one feature information,
    wherein the depth establishment unit includes a depth map initialization unit, the depth map initialization unit configured to establish an initial depth of the portion of the input image based on a position of the portion of the input image within the input image, such that portions of the input image having different positions are established to have different initial depths, determine the depth of the object located in the upper portion of the input image to be deeper than the depth of the object located in the lower portion of the input image,
    wherein the depth establishment unit further includes a depth update unit to filter depths stored in the depth map by repeatedly performing updating operations based on the weight,
    wherein the depth establishment unit comprises,
        a depth map initialization unit configured to establish an initial depth of at least one pixel of the input image, and to store the established initial depth in a depth map, and
        a depth update unit configured to calculate the depth of the portion of the input image by performing filtering based on the initial depth, and to update the depth map based on the calculated depth,
    wherein the apparatus further comprises,
        a down-scaling unit configured to down-scale the input image to a predetermined resolution,
        a second depth map initialization unit configured to establish a second initial depth of at least one pixel of the down-scaled input image, and to store the second initial depth in a second depth map,
        a second feature information extraction unit configured to extract at least one second feature information from the down-scaled input image, and
        a second depth update unit configured to calculate a second depth of the down-scaled input image by performing filtering based on the at least one second feature information and the second initial depth, and to update the second depth map using the second depth, and
        an up-scaling unit configured to upscale the updated second depth map based on a resolution of the input image, and
    wherein the depth map initialization unit is configured to establish the initial depth based on a depth stored in the up-scaled second depth map.

2. The apparatus of claim 1, wherein the at least one feature information is at least one of edge information, color information, luminance information, motion information, and histogram information.

3. The apparatus of claim 1, wherein the feature information extraction unit is configured to calculate the weight between the at least one pixel and adjacent pixels based on the at least one feature information, and the depth update unit is configured to perform the filtering based on the weight.

4. The apparatus of claim 1, wherein the depth map initialization unit is configured to establish the initial depth based on the at least one feature information, and store the initial depth in the depth map.

5. The apparatus of claim 1, further comprising:
a pre-processing unit configured to convert a color space of the input image or extract a motion vector of the input image by decoding the input image when the input image is an image which is encoded into a predetermined video stream.

6. The apparatus of claim 1, wherein the depth establishment unit comprises:
a depth map initialization unit configured to establish an initial depth of at least one block of the input image according to a respective grouping of a plurality of pixels of the input image into the at least one block, and store the initial depth in a depth map; and
a depth update unit configured to calculate a second depth of the at least one block by performing filtering based on the initial depth, and update the depth map based on the second depth.

7. The apparatus of claim 6, further comprising:
an up-scaling unit configured to up-scale the updated depth map based on the plurality of pixels.

8. The apparatus of claim 1, wherein any preexisting and pre-established depth values for the input image are unknown or non-existent and the depth establishment unit is configured to establish the depth of the portion of the input image based initially only on the at least one feature information.

9. A 3D video conversion apparatus to convert a two-dimensional (2-D) monocular video into a stereoscopic video, the apparatus comprising:
an extraction unit to extract at least one feature information from a single input image, the feature information being independent of any pre-established depth values of the input image;
a depth establishment unit to establish a depth of a portion of the input image based on the at least one feature information with regard to the portion of the input image, the portion being less than the entire image; and
a rendering unit to render the input image into a 3D video using the established depth of the portion of the input image,
wherein the feature information extraction unit calculates a weight so as to depend on similarities of feature information between the at least one pixel of the input image and adjacent pixels within the input image based on the at least one feature information,
wherein the depth establishment unit includes a depth map initialization unit, the depth map initialization unit configured to establish an initial depth of the portion of the input image based on a position of the portion of the input image within the input image, such that portions of the input image having different positions are established to have different initial depths, determine the depth of the object located in the upper portion of the input image to be deeper than the depth of the object located in the lower portion of the input image,
wherein the depth establishment unit further includes a depth update unit to filter depths stored in the depth map by repeatedly performing updating operations based on the weight,
wherein the depth establishment unit comprises,
a depth map initialization unit configured to establish an initial depth of at least one pixel of the input image, and to store the established initial depth of at least one pixel in a depth map, and
a depth update unit configured to calculate the depth of the portion of the input image by performing filtering based on the initial depth, and to update the depth map based on the calculated depth,
wherein the apparatus further comprises,
a down-scaling unit configured to down-scale the input image to a predetermined resolution,
a second depth map initialization unit configured to establish a second initial depth of at least one pixel of the down-scaled input image, and to store the second initial depth in a second depth map,
a second feature information extraction unit configured to extract at least one second feature information from the down-scaled input image,
a second depth update unit configured to calculate a second depth of the down-scaled input image by performing filtering based on the at least one second feature information and the second initial depth, and to update the second depth map using the second depth, and
an up-scaling unit configured to upscale the updated second depth map based on a resolution of the input image, and
wherein the depth map initialization unit is configured to establish the initial depth based on a depth stored in the up-scaled second depth map.

10. The apparatus of claim 9, wherein the rendering unit is configured to render the input image into the 3D video using the updated depth map.

11. The apparatus of claim 10, wherein the feature information extraction unit is configured to calculate the weight between the at least one pixel and adjacent pixels based on the at least one feature information, and the depth update unit is configured to perform the filtering based on the weight.

12. The apparatus of claim 9, wherein the at least one feature information is at least one of edge information, color information, luminance information, motion information, and histogram information.

13. The apparatus of claim 9, wherein the depth establishment unit comprises:
a depth map initialization unit configured establish an initial depth of at least one block of the input image according to a respective grouping of a plurality of pixels of the input image into the at least one block, and to store the initial depth in a depth map; and
a depth update unit configured to calculate a second depth of the at least one block by performing filtering based on the initial depth, and update the depth map based on the second depth.

14. The apparatus of claim 13, further comprising:
an up-scaling unit configured to upscale the updated depth map based on the plurality of pixels,
wherein the rendering unit is configured to render the input image into a 3D video using the up-scaled depth map.

15. The apparatus of claim 9, wherein any preexisting and pre-established depth values for the input image are unknown or non-existent and the depth establishment unit is configured to establish the depth of the portion of the input image based initially only on the at least one feature information.

16. A depth estimation method to convert a two-dimensional (2-D) monocular video into a stereoscopic video, the method comprising:
    extracting at least one feature information from a single input image, the feature information being independent of pre-established depth values of the input image; and
    establishing a depth of a portion of the input image based on the at least one feature information with regard to the portion of the input image, the portion being less than the entire image,
    wherein the extracting at least one feature information includes calculating a weight so as to depend on similarities of feature information between the at least one pixel of the input image and adjacent pixels within the input image based on the at least one feature information,
    wherein the establishing a depth of a portion of the input image further includes,
        establishing an initial depth of the portion of the input image based on a position of the portion of the input image within the input image, such that portions of the input image having different positions are established to have different initial depths, and
        determining the depth of the object located in the upper portion of the input image to be deeper than the depth of the object located in the lower portion of the input image,
    wherein the establishing a depth of a portion of the input image further includes updating the depth to filter depths stored in the depth map by repeatedly performing updating operations based on the weight,
    wherein the establishing a depth of a portion of the input image comprises,
        establishing an initial depth of at least one pixel of the input image and storing the initial depth in a depth map, and
        calculating the depth of the portion of the input image by performing filtering based on the initial depth, and updating the depth map based on the calculated depth,
    wherein the method further comprises,
        down-scaling the input image to a predetermined resolution,
        establishing a second initial depth of at least one pixel of the down-scaled input image, and storing the second initial depth in a second depth map,
        extracting at least one second feature information from the down-scaled input image, and
        calculating a second depth of the down-scaled input image by performing filtering based on the at least one second feature information and the second initial depth, and updating the second depth map using the second depth, and
        upscaling the updated second depth map based on a resolution of the input image, and
    wherein the establishing an initial depth of at least one pixel further includes establishing the initial depth based on a depth stored in the up-scaled second depth map.

17. The method of claim 16, wherein the updating the depth map performs filtering based on the weight.

18. The method of claim 16, wherein the at least one feature information is at least one of edge information, color information, luminance information, motion information, and histogram information.

19. The method of claim 16, wherein the establishing a depth of a portion of the input image comprises:
    establishing an initial depth of at least one block of the input image according to a respective grouping of a plurality of pixels of the input image into the at least one block, and storing the initial depth in a depth map; and
    calculating a second depth of the at least one block by performing filtering based on the initial depth, and updating the depth map based on the second depth.

20. The method of claim 19, further comprising:
    up-scaling the updated depth map based on the plurality of pixels.

21. The method of claim 16, wherein any preexisting and pre-established depth values for the input image are unknown or non-existent and the depth of the portion of the input image is initially established based only on the at least one feature information.

22. A non-transitory computer readable medium storing computer readable code to control at least one processing device to implement the method of claim 16.

23. A 3D video conversion method to convert a two-dimensional (2-D) monocular video into a stereoscopic video, the method comprising:
    extracting at least one feature information from a single input image, the feature information being independent of any pre-established depth values of the input image;
    establishing a depth of a portion of the input image based on the at least one feature information with regard to the portion of the input image, the portion being less than the entire image; and
    rendering the input image into a 3D video using the established depth of the portion of the input image,
    wherein the extracting at least one feature information includes calculating a weight so as to depend on similarities of feature information between the at least one pixel of the input image and adjacent pixels within the input image based on the at least one feature information,
    wherein the establishing a depth of a portion of the input image further includes,
        establishing an initial depth of the portion of the input image based on a position of the portion of the input image within the input image, such that portions of the input image having different positions are established to have different initial depths, and
        determining the depth of the object located in the upper portion of the input image to be deeper than the depth of the object located in the lower portion of the input image,
    wherein the establishing a depth of a portion of the input image further includes updating the depth to filter depths stored in the depth map by repeatedly performing updating operations based on the weight,
    wherein the establishing a depth of a portion of the input image comprises,
        establishing an initial depth of the at least one pixel of the input image, and storing the established initial depth of at least one pixel in a depth map, and
        calculating the depth of the portion of the input image by performing filtering based on the initial depth, and updating the depth map based on the calculated depth,
    wherein the method further comprises,
        down-scaling the input image to a predetermined resolution,
        establishing a second initial depth of at least one pixel of the down-scaled input image, and storing the second initial depth in a second depth map, extracting at least one second feature information from the down-scaled input image, and calculating a second depth of the down-scaled input image by performing filtering based on the at least one second feature information and the second initial depth, and updating the second depth map using the second depth, and upscaling the updated second depth map based on a resolution of the input image, and wherein the establishing an initial depth of at least one pixel further includes establishing the initial depth based on a depth stored in the up-scaled second depth map.

24. The method of claim 23 wherein the rendering the input image into the 3D video renders the input image into the 3D video using the updated depth map.

25. The method of claim 23,
wherein updating the depth map performs the filtering based on the weight.

26. The method of claim 23, wherein the at least one feature information is at least one of edge information, color information, luminance information, motion information, and histogram information.

27. The method of claim 23, wherein the establishing a depth of a portion of the input image comprises:
establishing an initial depth of at least one block of the input image according to a respective grouping of a plurality of pixels of the input image into the at least one block, and storing the initial depth in a depth map; and
calculating a second depth of the at least one block by performing filtering based on the initial depth, and updating the depth map based on the second depth.

28. The method of claim 27, further comprising:
up-scaling the updated depth map based on the plurality of pixels,
wherein the rendering the input image into the 3D video renders the input image into the 3D video using the up-scaled depth map.

29. The method of claim 23, wherein any preexisting and pre-established depth values for the input image are unknown or non-existent and the depth of the portion of the input image is initially established based only on the at least one feature information.

30. A non-transitory computer readable medium storing computer readable code to control at least one processing device to implement the method of claim 23.

31. An apparatus for estimating depth to convert a two-dimensional (2-D) monocular video into a stereoscopic video, the apparatus comprising:
a feature information extraction unit to extract at least one feature information from a single input image, the feature information being independent of any pre-established depth values of the input image; and
a depth establishment unit to establish a depth of a portion of the input image based on the at least one feature information with regard to the portion of the input image, the portion being less than the entire image,
wherein the feature information extraction unit calculates a weight so as to depend on similarities of feature information between the at least one pixel of the input image and adjacent pixels within the input image based on the at least one feature information,
wherein the depth establishment unit includes a depth map initialization unit, the depth map initialization unit configured to establish an initial depth of the portion of the input image based on a position of the portion of the input image within the input image, such that portions of the input image having different positions are established to have different initial depths, and determine the depth of the object located in the upper portion of the input image to be deeper than the depth of the object located in the lower portion of the input image,
wherein the depth establishment unit further includes a depth update unit to filter depths stored in the depth map by repeatedly performing updating operations based on the weight,
wherein the depth establishment unit comprises,
a depth map initialization unit configured to establish an initial depth of at least one pixel of the input image, and to store the established initial depth in a depth map, and
a depth update unit configured to calculate the depth of the portion of the input image by performing filtering based on the initial depth, and to update the depth map based on the calculated depth,
wherein the apparatus further comprises,
a down-scaling unit configured to down-scale the input image to a predetermined resolution,
a second depth map initialization unit configured to establish a second initial depth of at least one pixel of the down-scaled input image, and to store the second initial depth in a second depth map,
a second feature information extraction unit configured to extract at least one second feature information from the down-scaled input image,
a second depth update unit configured to calculate a second depth of the down-scaled input image by performing filtering based on the at least one second feature information and the second initial depth, and to update the second depth map using the second depth, and
an up-scaling unit configured to upscale the updated second depth map based on a resolution of the input image, and
wherein the depth map initialization unit is configured to establish the initial depth based on a depth stored in the up-scaled second depth map.

32. The apparatus of claim 31, wherein the at least one feature information is at least one of edge information, color information, luminance information, motion information, and histogram information.

33. The apparatus of claim 31, wherein the feature information extraction unit is configured to calculate the weight between the at least one pixel and adjacent pixels based on the at least one feature information, and the depth update unit is configured to perform the filtering based on the weight.

34. The apparatus of claim 31, wherein the depth map initialization unit is configured to establish the initial depth based on the at least one feature information, and store the initial depth in the depth map.

35. The apparatus of claim 31, further comprising:
a pre-processing unit configured to convert a color space of the input image or extract a motion vector for the input image relative to other images.

36. The apparatus of claim 31, wherein the depth establishment unit comprises:
a depth map initialization unit configured to establish an initial depth of at least one block of the input image according to a respective grouping of a plurality of pixels of the input image into the at least one block, and store the initial depth in a depth map; and
a depth update unit configured to calculate a second depth of the at least one block by performing filtering based on the initial depth, and update the depth map based on the second depth.

37. The apparatus of claim 36, further comprising:
an up-scaling unit configured to up-scale the updated depth map based on the plurality of pixels.

38. The apparatus of claim 31, wherein any preexisting and pre-established depth values for the input image are unknown or non-existent and the depth establishment unit is configured to establish the depth of the portion of the input image based initially only on the at least one feature information.

39. The apparatus of claim 31, further comprising:
a rendering unit configured to render the input image into a 3D image using the established depth of the portion of the input image.

40. A depth estimation method to convert a two-dimensional (2-D) monocular video into a stereoscopic video, the method comprising:
extracting at least one feature information from a single input image, the feature information being independent of pre-established depth values of the input image; and
establishing a depth of a portion of the input image based on the at least one feature information with regard to the portion of the input image, the portion being less than the entire image,
wherein the extracting at least one feature information includes calculating a weight so as to depend on similarities of feature information between the at least one pixel of the input image and adjacent pixels within the input image based on the at least one feature information,
wherein the establishing a depth of a portion of the input image further includes,
establishing an initial depth of the portion of the input image based on a position of the portion of the input image within the input image, such that portions of the input image having different positions are established to have different initial depths,
determining the depth of the object located in the upper portion of the input image to be deeper than the depth of the object located in the lower portion of the input image, and
wherein the establishing a depth of a portion of the input image further includes updating the depth to filter depths stored in the depth map by repeatedly performing updating operations based on the weight,
wherein the establishing a depth of a portion of the input image comprises,
establishing an initial depth of at least one pixel of the input image and storing the initial depth in a depth map, and
calculating the depth of the portion of the input image by performing filtering based on the initial depth, and updating the depth map based on the calculated depth,
wherein the method further comprises,
down-scaling the input image to a predetermined resolution,
establishing a second initial depth of at least one pixel of the down-scaled input image, and storing the second initial depth in a second depth map,
extracting at least one second feature information from the down-scaled input image, and
calculating a second depth of the down-scaled input image by performing filtering based on the at least one second feature information and the second initial depth, and updating the second depth map using the second depth, and
upscaling the updated second depth map based on a resolution of the input image, and
wherein the establishing an initial depth of at least one pixel further includes establishing the initial depth based on a depth stored in the up-scaled second depth map.

41. The method of claim 40,
wherein the updating the depth map performs filtering based on the weight.

42. The method of claim 40, wherein the at least one feature information is at least one of edge information, color information, luminance information, motion information, and histogram information.

43. The method of claim 40, wherein the establishing a depth comprises:
establishing an initial depth of at least one block of the input image according to a respective grouping of a plurality of pixels of the input image into the at least one block, and storing the initial depth in a depth map; and
calculating a second depth of the at least one block by performing filtering based on the initial depth, and updating the depth map based on the second depth.

44. The method of claim 43, further comprising:
up-scaling the updated depth map based on the plurality of pixels.

45. The method of claim 40, wherein any preexisting and pre-established depth values for the input image are unknown or non-existent and the depth of the portion of the input image is initially established based only on the at least one feature information.

46. The method of claim 40, further comprising:
rendering the input image into a 3D image using the established depth of the portion of the input image.

47. A non-transitory computer readable medium storing computer readable code to control at least one processing device to implement the method of claim 40.

* * * * *